United States Patent
Choi et al.

(10) Patent No.: US 12,337,685 B2
(45) Date of Patent: Jun. 24, 2025

(54) DISPLAY APPARATUS FOR VEHICLE AND METHOD OF CONTROLLING THE SAME

(71) Applicant: HYUNDAI MOBIS CO., LTD., Seoul (KR)

(72) Inventors: Jong Wan Choi, Yongin-si (KR); Hyung Soo Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 81 days.

(21) Appl. No.: 18/199,895

(22) Filed: May 19, 2023

(65) Prior Publication Data

US 2024/0092169 A1    Mar. 21, 2024

(30) Foreign Application Priority Data

Sep. 15, 2022 (KR) .................. 10-2022-0116265
Sep. 15, 2022 (KR) .................. 10-2022-0116266
Sep. 16, 2022 (KR) .................. 10-2022-0117126

(51) Int. Cl.
*B60K 35/00* (2024.01)
*B60K 35/10* (2024.01)
*B60K 35/22* (2024.01)
*B60K 35/81* (2024.01)

(52) U.S. Cl.
CPC .............. *B60K 35/00* (2013.01); *B60K 35/10* (2024.01); *B60K 35/22* (2024.01); *B60K 35/81* (2024.01); *B60K 2360/146* (2024.01); *B60K 2360/682* (2024.01); *B60K 2360/692* (2024.01)

(58) Field of Classification Search
CPC ........ B60K 35/00; B60K 35/10; B60K 35/22; B60K 35/53; B60K 35/81; B60K 2360/146–1472; B60K 2360/682; B60K 2360/692
See application file for complete search history.

(56) References Cited

U.S. PATENT DOCUMENTS

2022/0001745 A1*   1/2022   Wall ................ B60K 35/50

FOREIGN PATENT DOCUMENTS

| DE | 10 2019 206935 | 11/2020 |
| DE | 10 2021 118524 | 9/2022 |
| EP | 3 040 230 | 7/2016 |
| KR | 10-2335522 | 10/2018 |

OTHER PUBLICATIONS

Extended European Search Report dated Oct. 20, 2023 issued in 23174521.7.
English Language Abstract of DE 10 2019 206935 published Nov. 19, 2020.
English Language Abstract of DE 10 2021 118524 published Sep. 29, 2022.

* cited by examiner

*Primary Examiner* — Michael Pervan
(74) *Attorney, Agent, or Firm* — DLA PIPER LLP US

(57) ABSTRACT

A display apparatus for a vehicle includes a cockpit part including an opening, a guide part mounted within the cockpit part, a display unit disposed within the cockpit part, moved along the guide part so that the display unit has a curved line-shaped moving path and configured to appear and disappear through the opening, and a driving part configured to provide electric power to the display unit so that the display unit is moved on the guide part.

14 Claims, 29 Drawing Sheets

DISPLAY APPARATUS FOR VEHICLE AND METHOD OF CONTROLLING THE SAME

CROSS-REFERENCE TO RELATED APPLICATIONS

This application claims the benefit under 35 U.S.C. § 119(a) of priority to Korean Patent Application Nos. 10-2022-0116265, 10-2022-0117126, and 10-2022-0116266 filed on Sep. 15, 2022, Sep. 16, 2022, and Sep. 15, 2022 in the Korean Intellectual Property Office, the entire disclosure of which is incorporated herein by reference for all purposes.

BACKGROUND

Field

Exemplary embodiments of the present disclosure relate to a display apparatus for a vehicle and a method of controlling the same, and more particularly, to a display apparatus for a vehicle in which the height of the display apparatus that protrudes upward from a cockpit in a swivel moving way can be adjusted in multiple stages, and a method of controlling the same.

Discussion of the Background

A display apparatus for a vehicle is one of apparatuses for securing a driver's convenience. A display for audio/video is mounted on a cockpit that is installed at the front of the room of a vehicle.

A pop-up type display apparatus appears and disappears perpendicularly in the cockpit of a vehicle. When the display apparatus is not used, in order for the display apparatus to be fully received in the cockpit, a receiving space within the cockpit needs to be sufficiently secured to the height or more of the display apparatus.

When the pop-up type display apparatus is applied to a vehicle, the utilization of the interior space of the vehicle is reduced because the thickness of the cockpit is inevitably increased. For this reason, a large-sized display apparatus cannot be implemented in a pop-up type. Accordingly, there is a need to improve such a problem.

The background technology of the present disclosure is disclosed in Korean Patent No. 10-2335522 (Dec. 1, 2021, entitled "POP-UP CONSOLE FOR THE VEHICLE").

SUMMARY

Various embodiments are directed to a display apparatus for a vehicle in which the height of the display apparatus that protrudes upward from a cockpit in a swivel moving way can be adjusted in multiple stages.

Various embodiments are directed to a method of controlling a display apparatus for a vehicle in which the height of the display apparatus that protrudes upward from a cockpit can be adjusted in multiple stages.

In an embodiment, a display apparatus for a vehicle may include a cockpit part including an opening, a guide part mounted within the cockpit part, a display unit disposed within the cockpit part, moved along the guide part so that the display unit has a curved line-shaped moving path and configured to appear and disappear through the opening, and a driving part configured to provide electric power to the display unit so that the display unit is moved on the guide part.

The display unit may be moved along the guide part so that the display unit comes from and goes to a plurality of points on the guide part. A protruding height of the display unit that protrudes to the outside through the opening may be different at each of the plurality of points.

The display unit may include a plurality of display parts for outputting a screen. The display parts that neighbor each other may be connected to form a set angle.

The display unit may further include a display bracket part configured to support the display part and a display gear part rotatably mounted on the display bracket part and moved along the guide part while being rotated by the driving part.

Each of the plurality of display parts may include a first display part formed to have a first upper and lower width and configured to protrude to the outside through the opening when the display gear part reaches a first point on the guide part, a second display part connected to the bottom of the first display part, formed to have a second upper and lower width, and configured to protrude to the outside through the opening when the display gear part reaches a second point on the guide part, and a third display part connected to the bottom of the second display part, formed to have a third upper and lower width, and configured to protrude to the outside through the opening when the display gear part reaches a third point on the guide part.

The guide part may include a guide body part mounted on the cockpit part and formed to have a curved surface toward a passenger seat and a guide gear part having a gear formed along the curved surface of the guide body part so that a path of the display gear part is formed and engaged with the display gear part.

The display apparatus may further include a sensor part disposed in the guide body part in a plural number along the guide gear part and configured to detect a location of the display unit and a control part configured to control an operation of the driving part in response to a detection signal from the plurality of sensor parts.

The control part may be configured to enable the first display part to protrude to the outside through the opening, and the second display part and the third display part to be disposed within the cockpit part by driving and controlling the display gear part so that the display gear part reaches the first point on the guide part when receiving a reduction mode command, to enable the first display part and the second display part to protrude to the outside through the opening, and the third display part to be disposed within the cockpit part by driving and controlling the display gear part so that the display gear part reaches the second point on the guide part when receiving a standard mode command, and to enable the first display part and the second display part and the third display part to protrude to the outside through the opening by driving and controlling the display gear part so that the display gear part reaches the third point on the guide part when receiving an extension mode command.

In another embodiment, a display apparatus for a vehicle may include a cockpit part including an opening, a guide part mounted within the cockpit part, a display unit disposed within the cockpit part, moved along the guide part so that the display unit has a curved line-shaped moving path and configured to appear and disappear through the opening, a driving part configured to provide electric power to the display unit so that the display unit is moved on the guide part, an air gesture detection part installed in the cockpit part and configured to detect a movement of a passenger, and a control part configured to control an operation of the display unit in response to a gesture signal from the air gesture detection part.

The air gesture detection part may include an air sensor part configured to scan a movement of the passenger and an air gesture recognition part configured to recognize an air gesture corresponding to the movement of the passenger. The control part may control an operation of a display screen of the display unit in response to the air gesture recognized by the air gesture recognition part.

The air gesture detection part may include a first air gesture detection part installed at the top of the cockpit part through which the display unit appears and disappears, a second air gesture detection part installed on a front surface of the cockpit part so that the second air gesture detection part is closer to a passenger than the first air gesture detection part, and a third air gesture detection part installed in a central partition part of the cockpit part.

The display unit may be moved along the guide part so that the display unit comes from and goes to a plurality of points on the guide part. A protruding height of the display unit that protrudes to the outside through the opening may be different at each of the plurality of points.

The display unit may include a plurality of display parts for outputting a screen. The display parts that neighbor each other may be connected to form a set angle.

The plurality of display parts may include a first display part formed to have a first upper and lower width and formed to have a plane as a front surface thereof, a second display part connected to the bottom of the first display part, formed to have a second upper and lower width, and formed to have a plane as a front surface thereof, and a third display part connected to the bottom of the second display part, formed to have a third upper and lower width, and formed to have a plane as a front surface thereof.

The control part is configured to enable the first display part to protrude to the outside through the opening and the second display part and the third display part to be disposed within the cockpit part, when receiving a reduction mode command, enable the first display part and the second display part to protrude to the outside through the opening and the third display part to be disposed within the cockpit part, when receiving a standard mode command, and enable the first display part, the second display part, and the third display part to protrude to the outside through the opening, when receiving an extension mode command.

In still another embodiment, a method of controlling a display apparatus for a vehicle is a method of controlling a display apparatus for a vehicle in which a protruding height of a display unit that protrudes to the outside through an opening of a cockpit part based on a plurality of display modes is adjusted in multiple stages. The method may include determining whether a start-up of the vehicle has become on, activating the display unit when it is determined that the start-up of the vehicle has become on, determining whether the display mode of the activated display unit is a standard mode, and changing the display mode into the standard mode when it is determined that the display mode is not the standard mode.

The plurality of display modes may include the standard mode, a reduction mode in which a protruding height of the display unit is smaller than a protruding height of the display unit in the standard mode, and an extension mode in which a protruding height of the display unit is greater than the protruding height of the display unit in the standard mode.

The display unit may include a first display part formed to have a first upper and lower width and configured to protrude to the outside through the opening in the reduction mode, the standard mode, and the extension mode, a second display part connected to the bottom of the first display part, formed to have a second upper and lower width, and configured to protrude to the outside through the opening in the standard mode and the extension mode, and a third display part connected to the bottom of the second display part, formed to have a third upper and lower width, and configured to protrude to the outside through the opening in the extension mode.

A screen area that is formed by the first display part and the second display part that have protruded to the outside through the opening in the standard mode may include a standard cluster display part and a standard infortainment display part. The standard cluster display part may be disposed on one side of the screen area and configured to display at least any one of a driving environment, navigation information, and a speedometer in a graphic form. The standard infortainment display part may be disposed on the other side of the screen area and configured to display infortainment content in a graphic form.

According to the display apparatus for a vehicle according to an embodiment of the present disclosure, since the display unit is moved in the cockpit part in a swivel moving way, a space that is used to receive the display unit within the cockpit part can be reduced and the utilization of an interior space of the vehicle can be improved.

Furthermore, according to the present disclosure, since a receiving space within the cockpit part can be reduced, an increase in the size of the display unit can be implemented while not increasing the thickness of the cockpit part.

Furthermore, according to the present disclosure, a phenomenon in which a screen is crushed or distorted can be reduced because a front surface from which various types of information or content are output in the plurality of display parts is formed of a plane.

Furthermore, according to the present disclosure, driving convenience along with relaxation convenience can be improved and a danger of an accident can be reduced because a specific mode can be selected among a plurality of display modes depending on a situation.

Furthermore, according to the present disclosure, since the display unit can be manipulated in a contactless way, the occurrence of a health and hygiene problem, such as a virus infection attributable to direct contact with the display unit, can be reduced.

DETAILED DESCRIPTION OF THE ILLUSTRATED EMBODIMENTS

Figure 1:
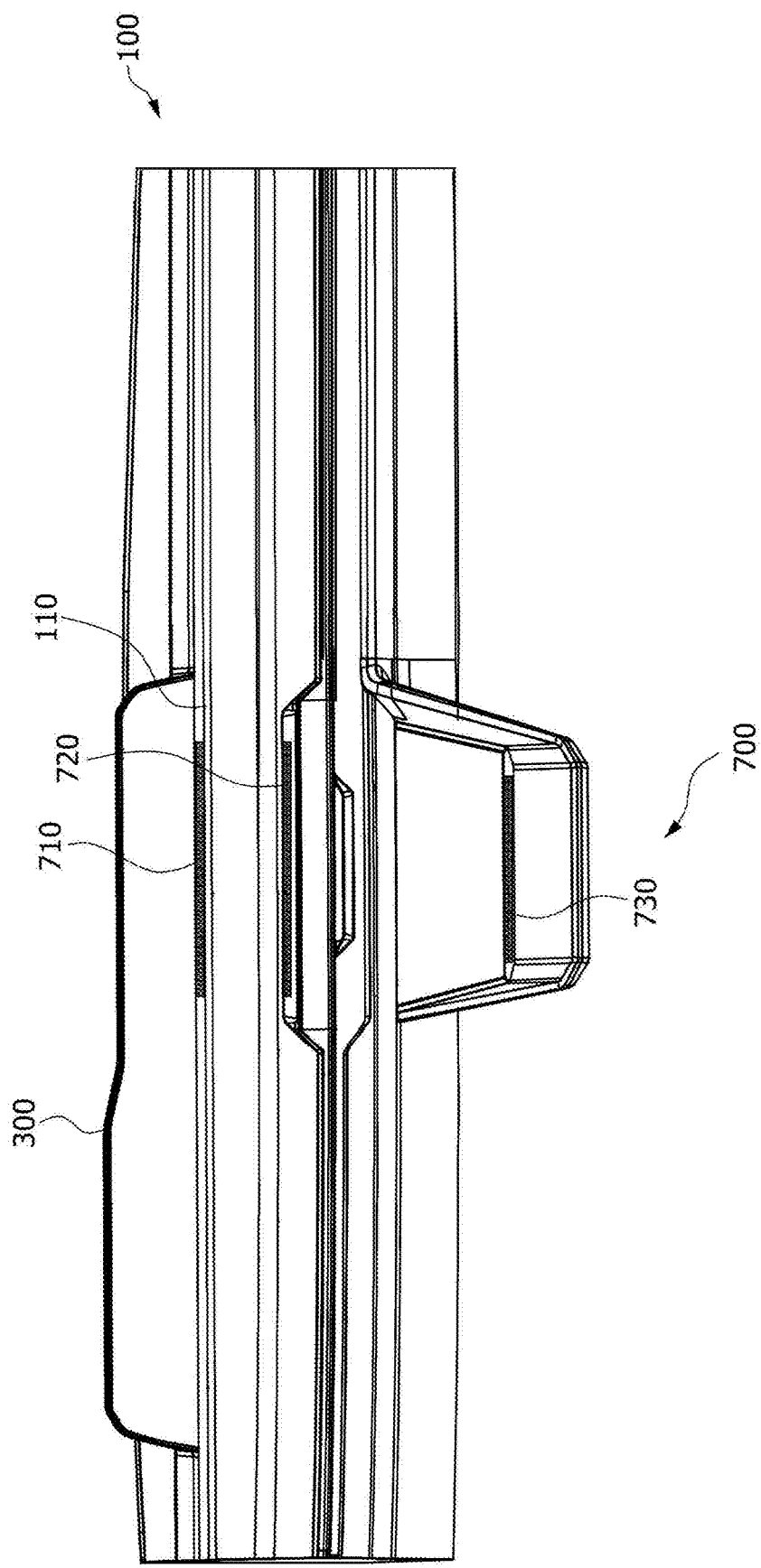
FIG. 1 is a front perspective view schematically illustrating a display apparatus for a vehicle according to an embodiment of the present disclosure.

Hereinafter, a display apparatus for a vehicle and a method of controlling the same will be described below with reference to the accompanying drawings through various exemplary embodiments. In this process, the thicknesses of lines or the sizes of elements illustrated in the drawings may have been exaggerated for the clarity of a description and for convenience' sake.

Furthermore, terms to be described below have been defined by taking into consideration their functions in the present disclosure, and may be changed depending on a user or operator's intention or practice. Accordingly, such terms should be defined based on the overall contents of this specification.

Figure 2:
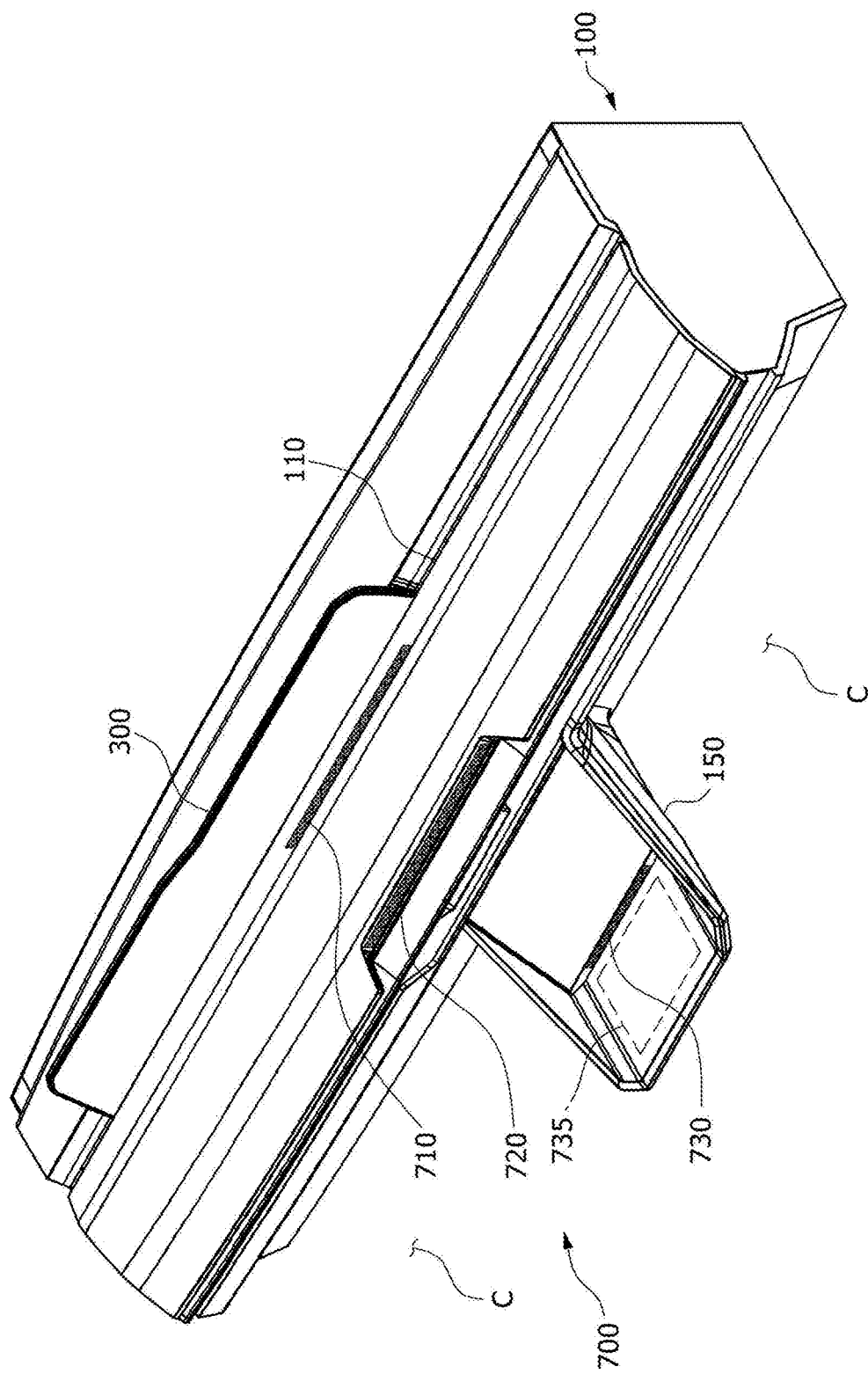
FIG. 2 is a perspective view schematically illustrating the display apparatus for a vehicle according to an embodiment of the present disclosure.
Figure 3:
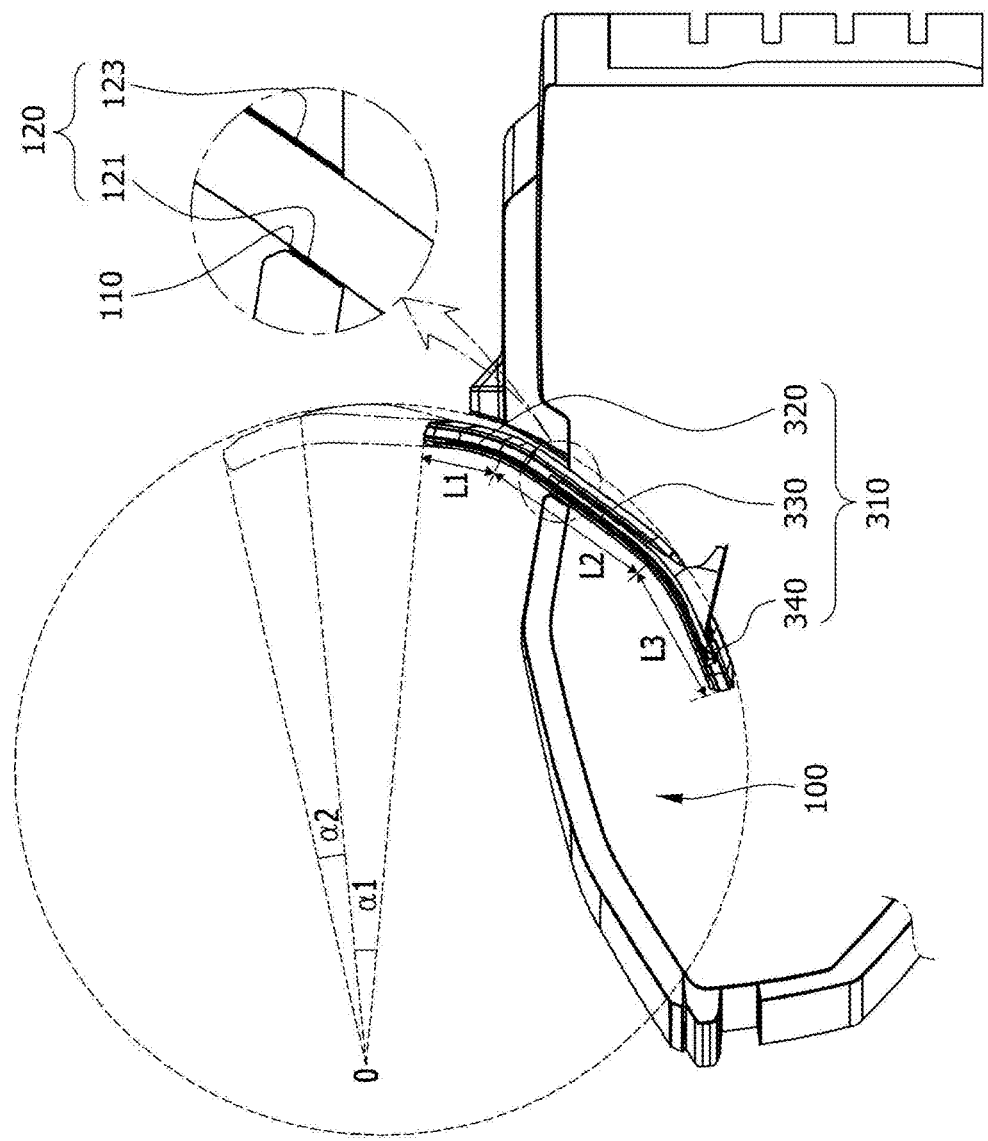
FIG. 3 is a lateral cross-sectional view schematically illustrating the display apparatus for a vehicle according to an embodiment of the present disclosure.
Figure 4:
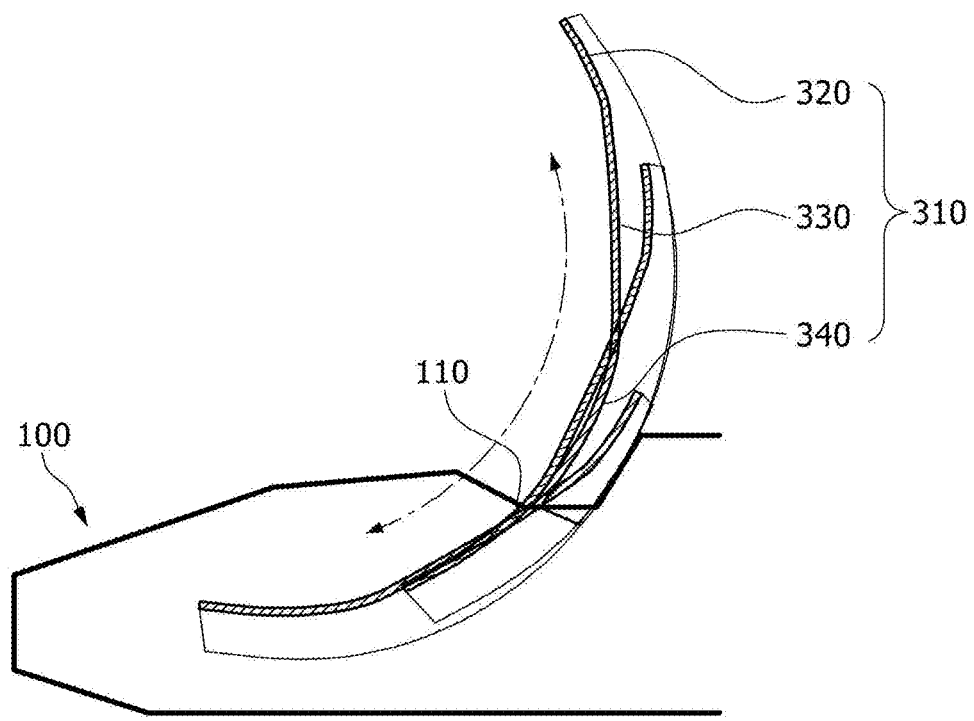
FIG. 4 is a lateral cross-sectional view schematically illustrating the state in which a display unit is rotated in a cockpit part in an embodiment of the present disclosure.
Figure 5:
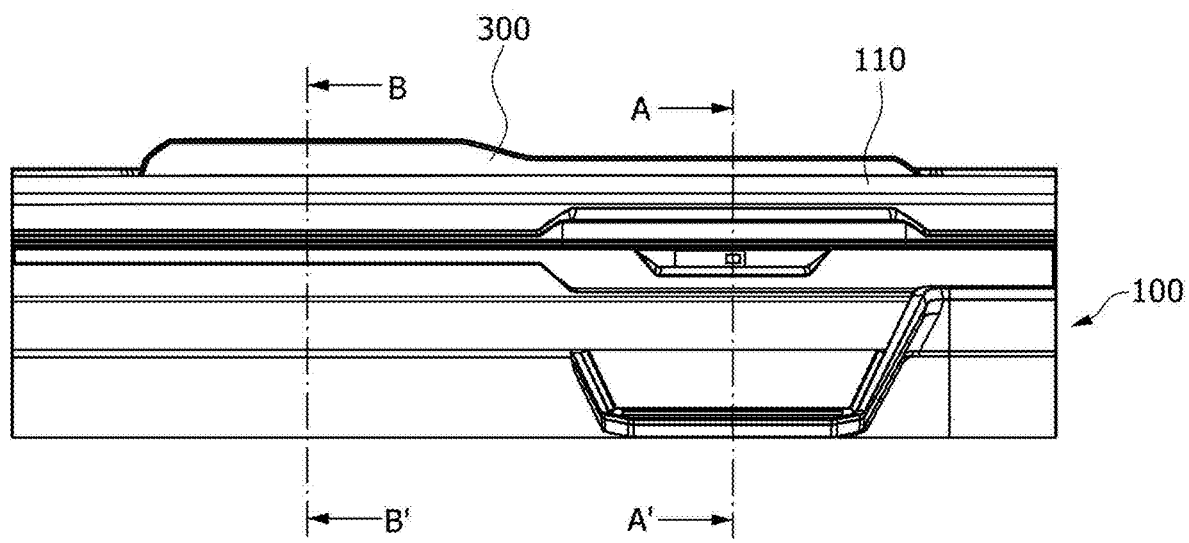
FIG. 5 is a front view schematically illustrating the display apparatus for a vehicle in a reduction mode in an embodiment of the present disclosure.
Figure 6:
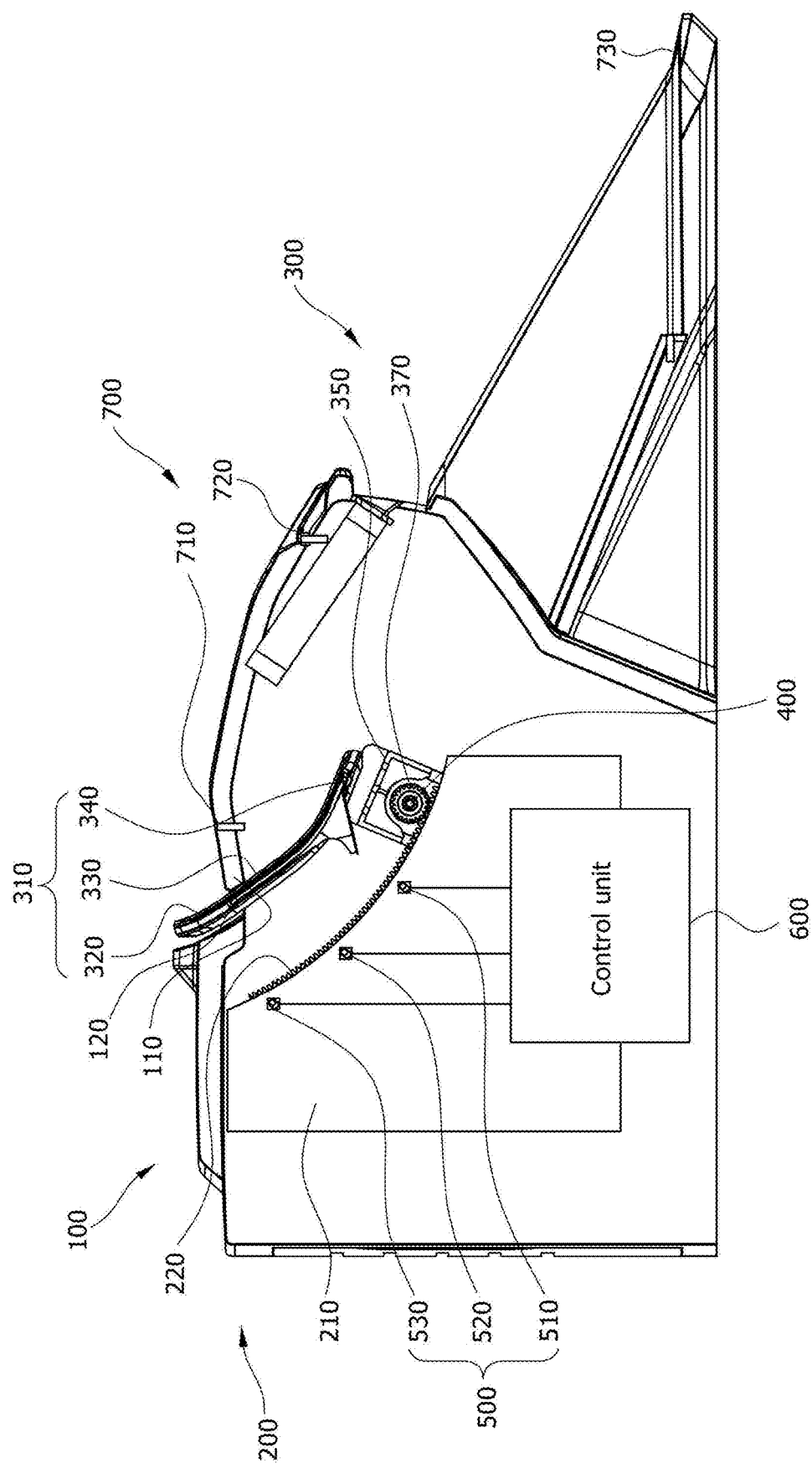
FIG. 6 is a diagram schematically illustrating a cross section taken along line A-A' in FIG. 5.
Figure 7:
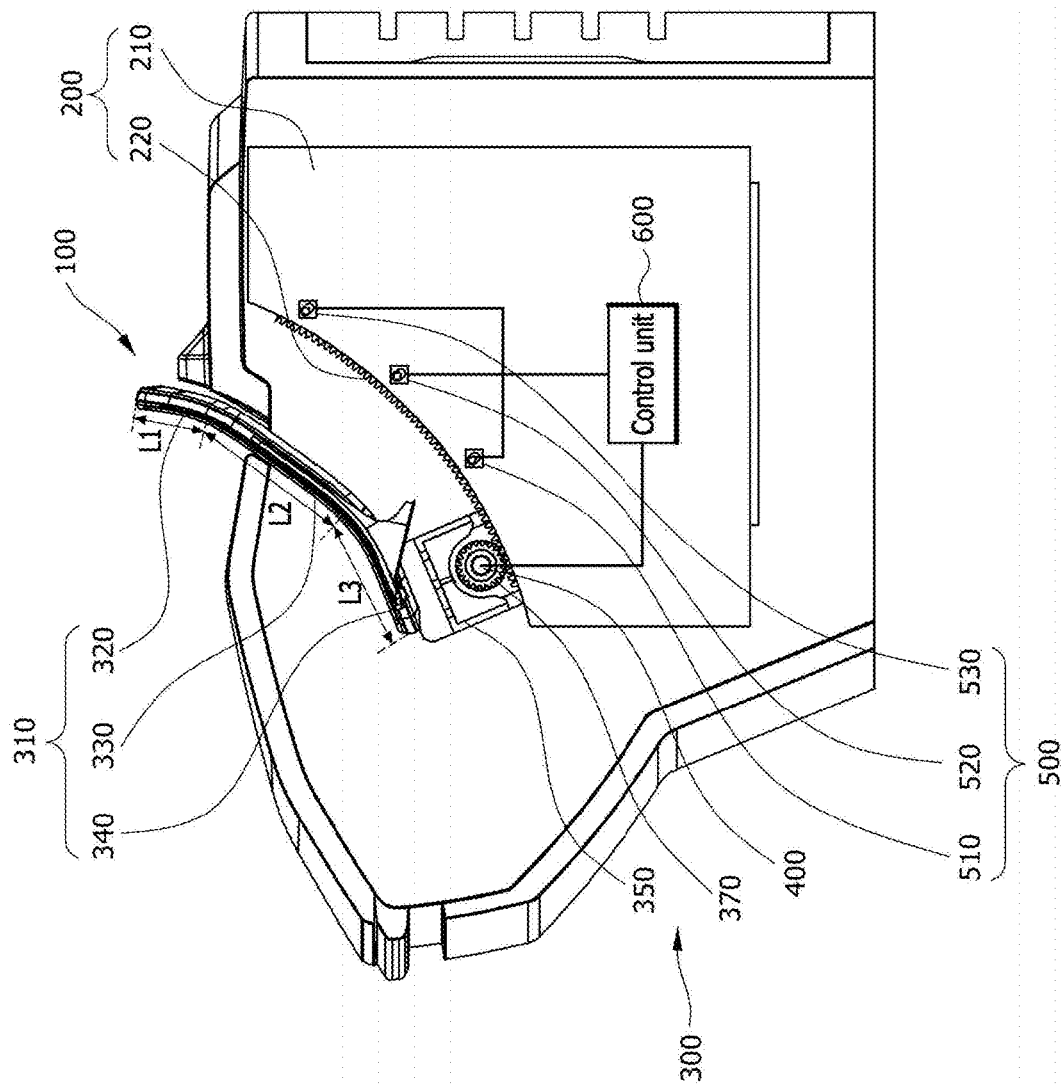
FIG. 7 is a diagram schematically illustrating a cross section taken along line B-B' in FIG. 5.
Figure 8:
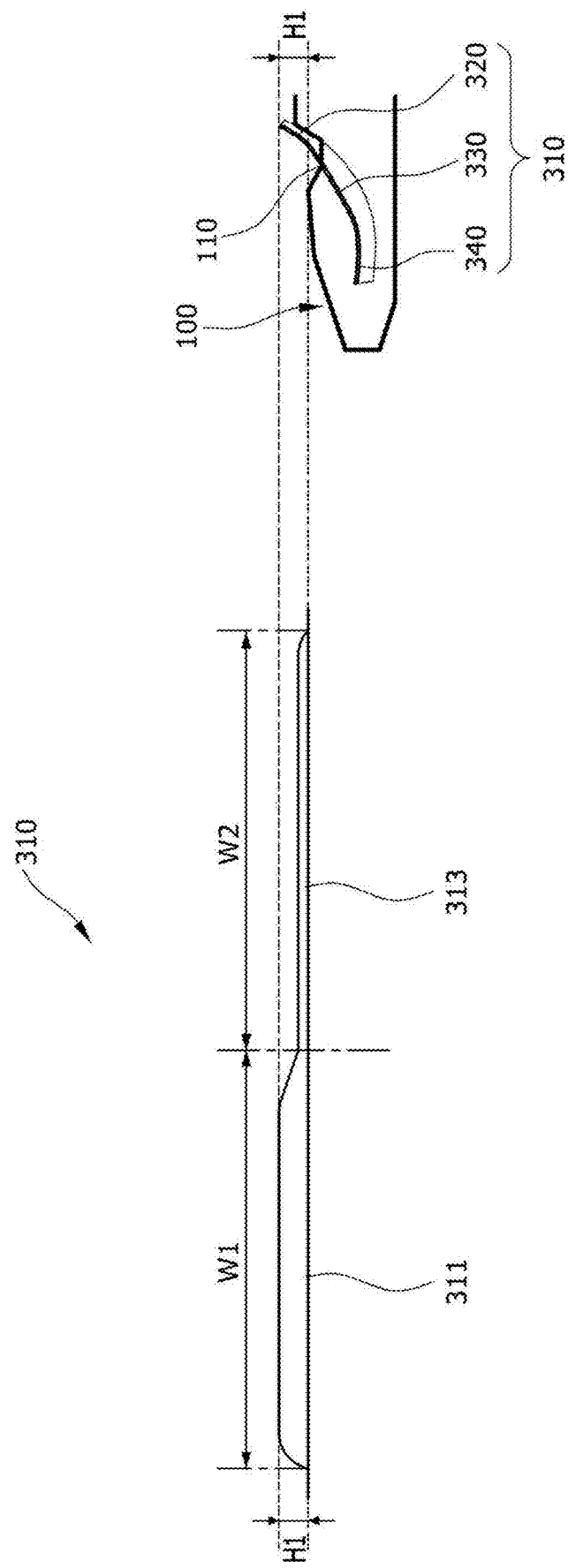
FIG. 8 is a diagram illustrating the protruding height of the display unit in the reduction mode in an embodiment of the present disclosure.
Figure 9:
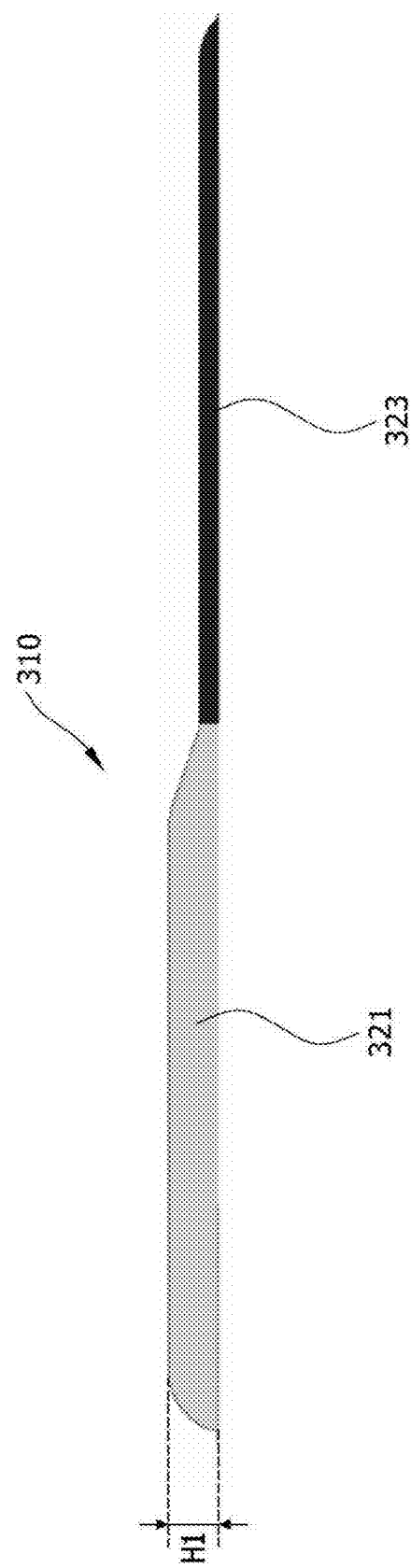
FIG. 9 is a diagram illustrating the deployment of a screen area of the display unit in the reduction mode in an embodiment of the present disclosure.
Figure 10:
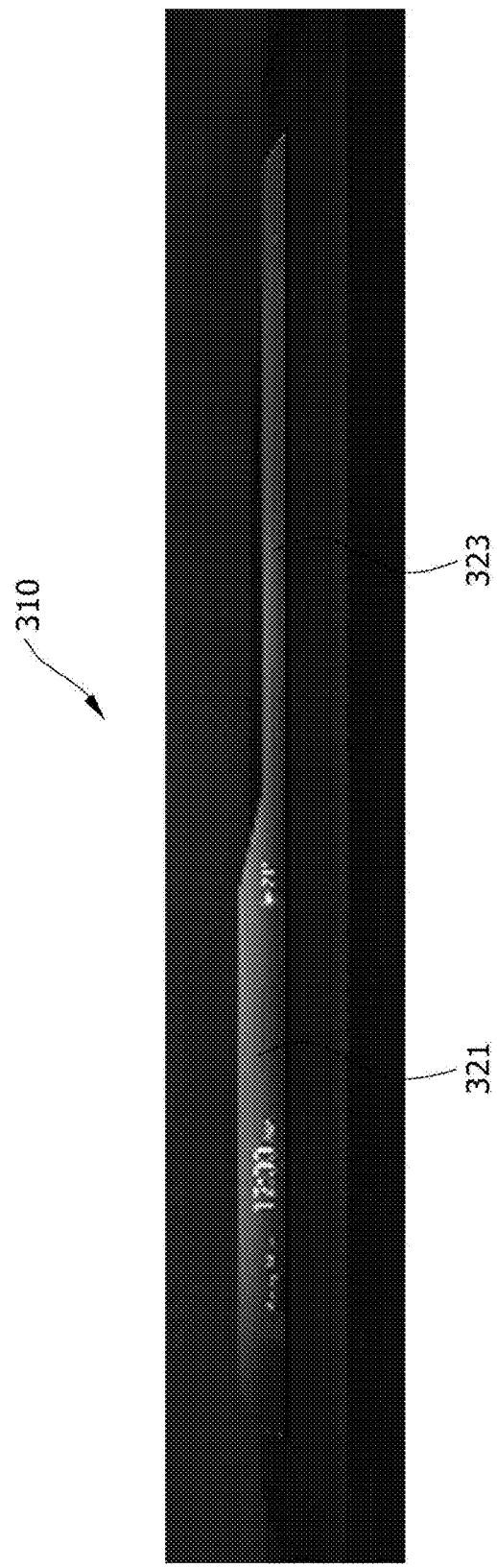
FIG. 10 is an exemplary diagram of information that is displayed in a screen area of the display unit in the reduction mode in an embodiment of the present disclosure.
Figure 11:
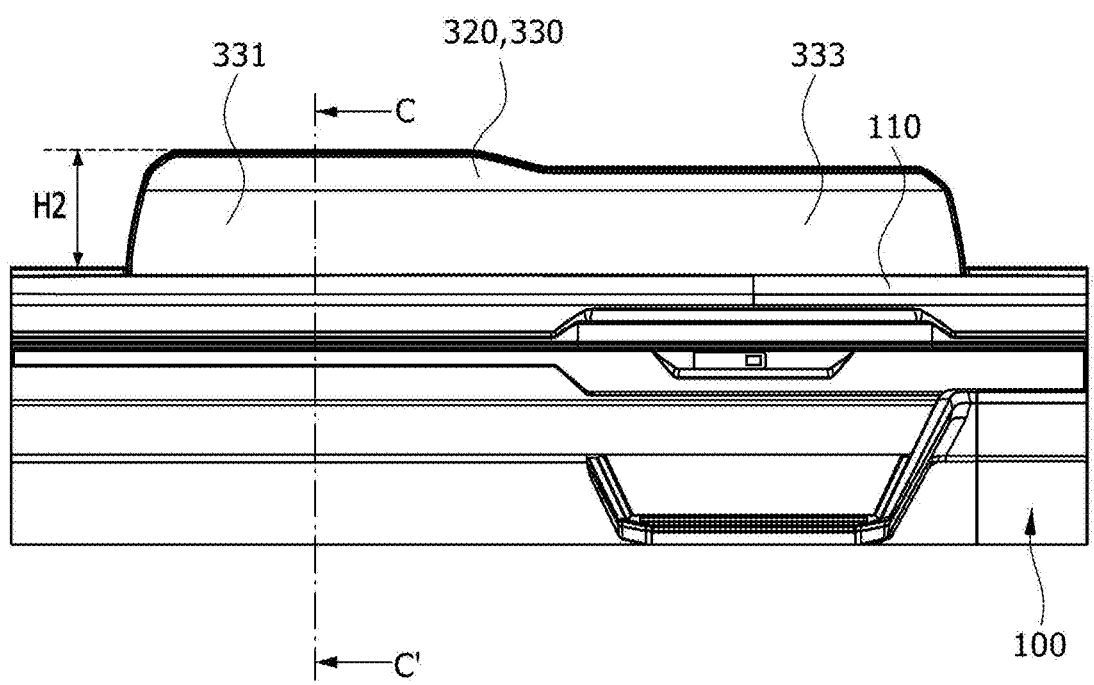
FIG. 11 is a front view schematically illustrating the display apparatus for a vehicle in a standard mode in an embodiment of the present disclosure.
Figure 12:
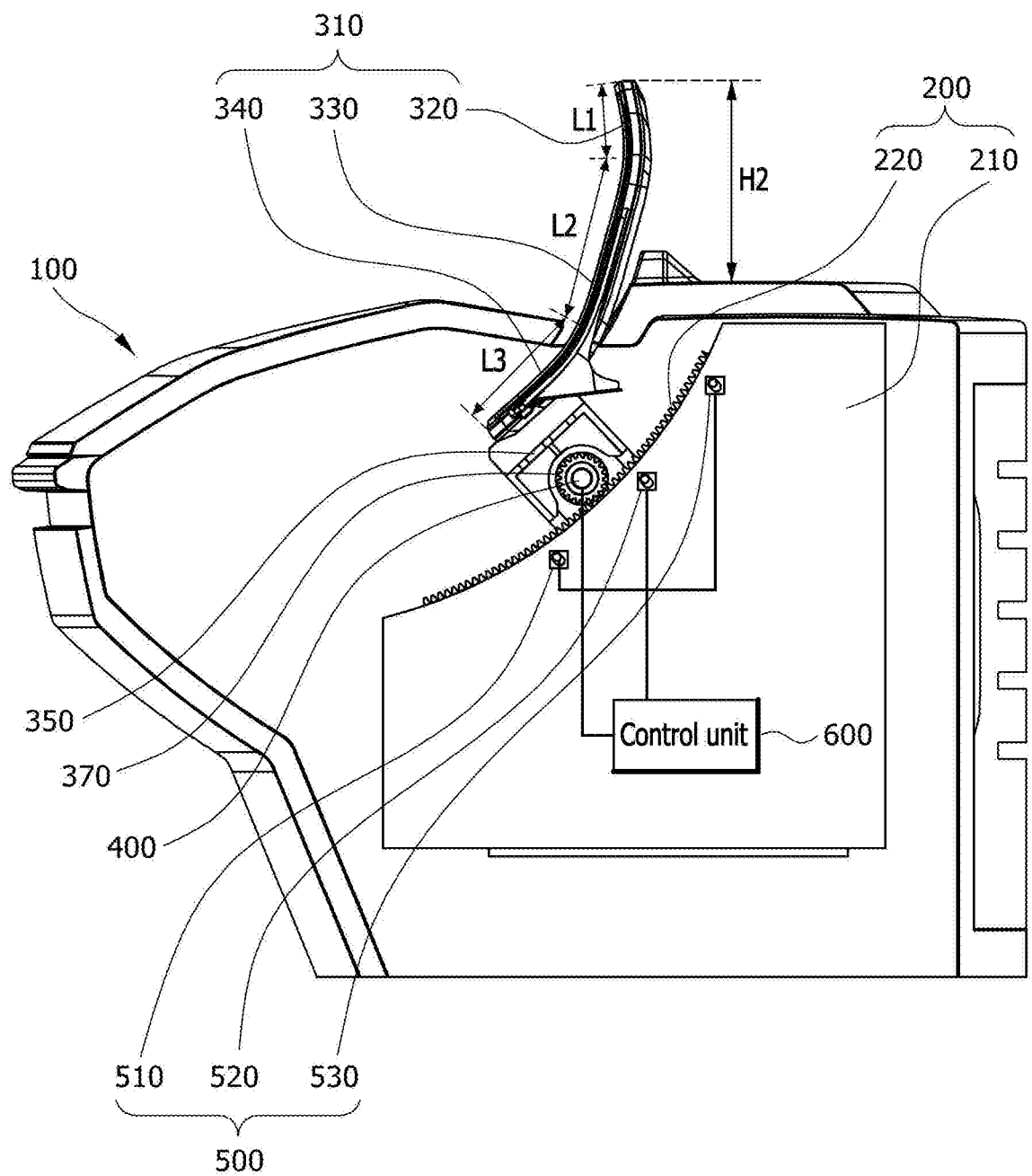
FIG. 12 is a diagram schematically illustrating a cross section taken along line C-C' in FIG. 11.
Figure 13:
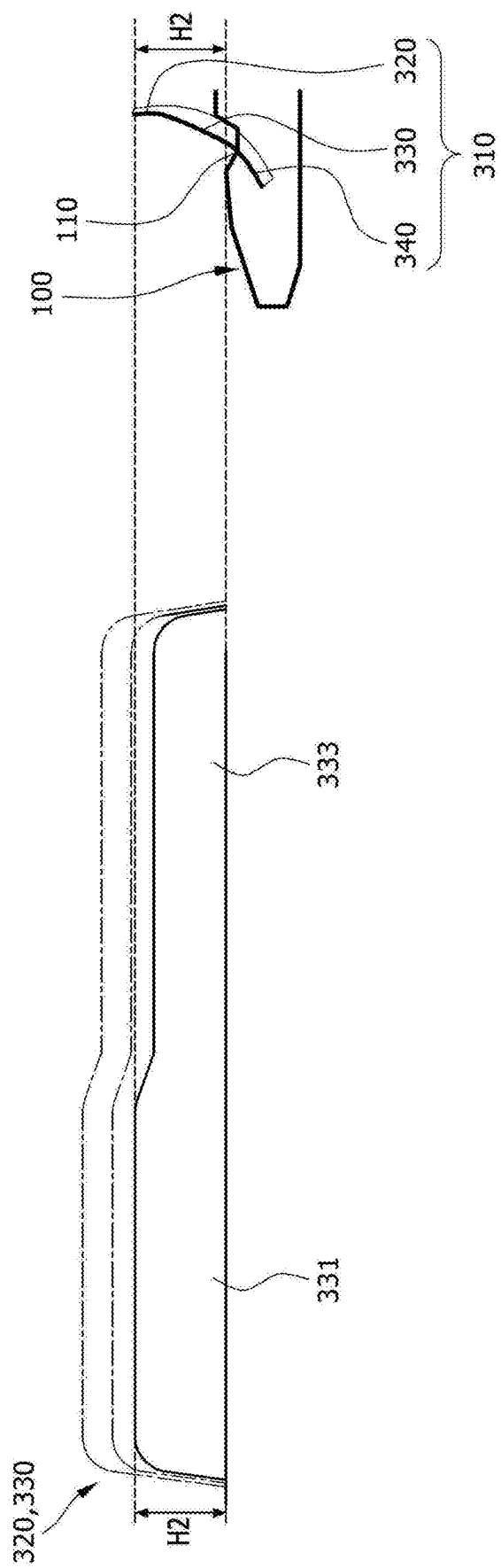
FIG. 13 is a diagram illustrating the protruding height of the display unit in the standard mode in an embodiment of the present disclosure.
Figure 14:
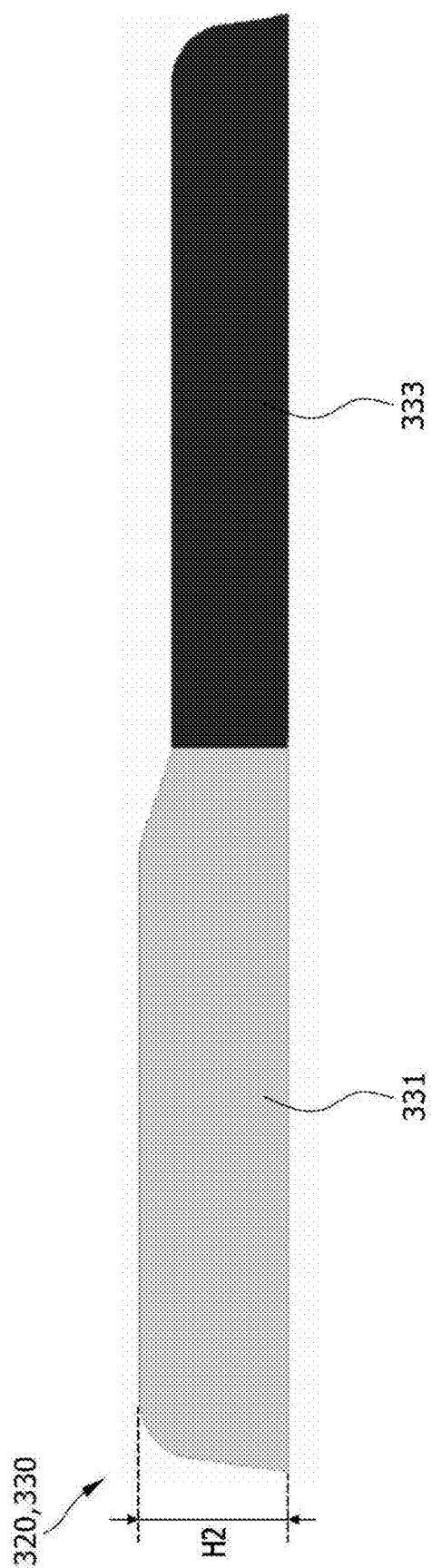
FIG. 14 is a diagram illustrating the deployment of the screen area of the display unit in the standard mode in an embodiment of the present disclosure.
Figure 15:
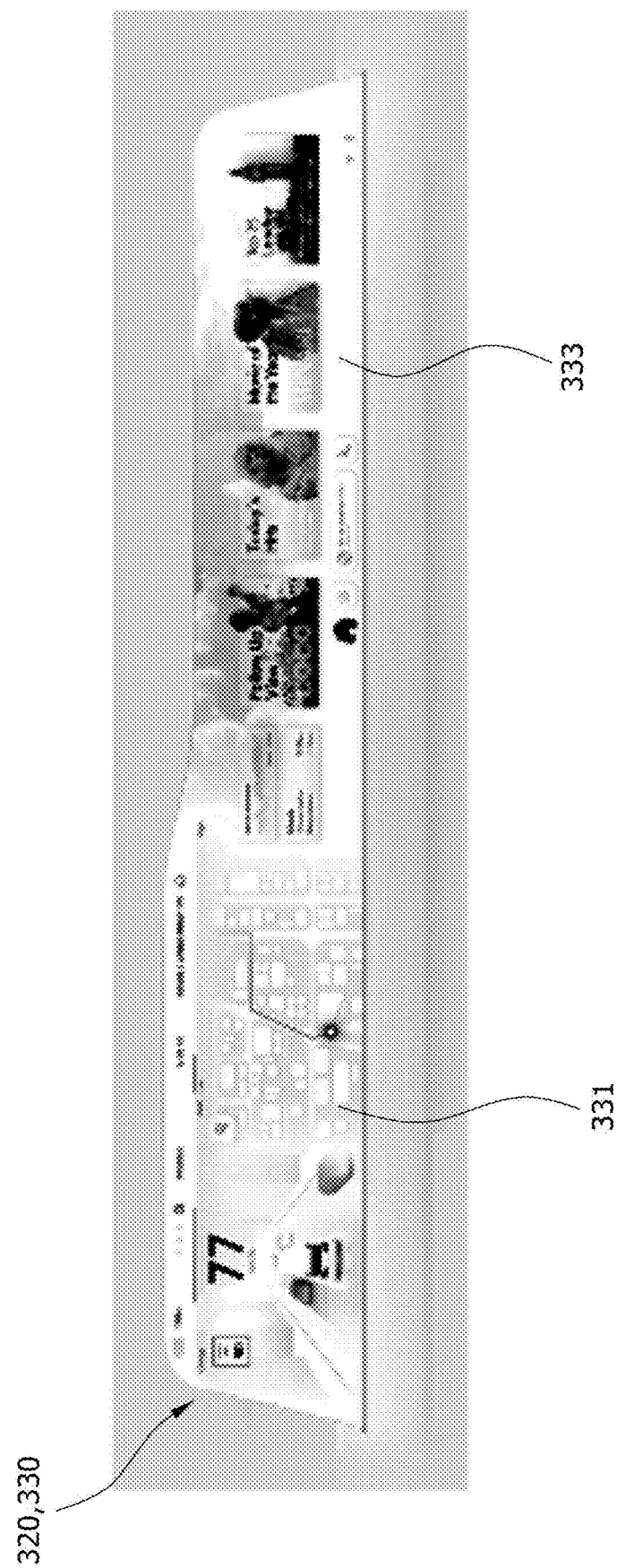
FIG. 15 is an exemplary diagram of information that is displayed in the screen area of the display unit in the standard mode in an embodiment of the present disclosure.
Figure 16:
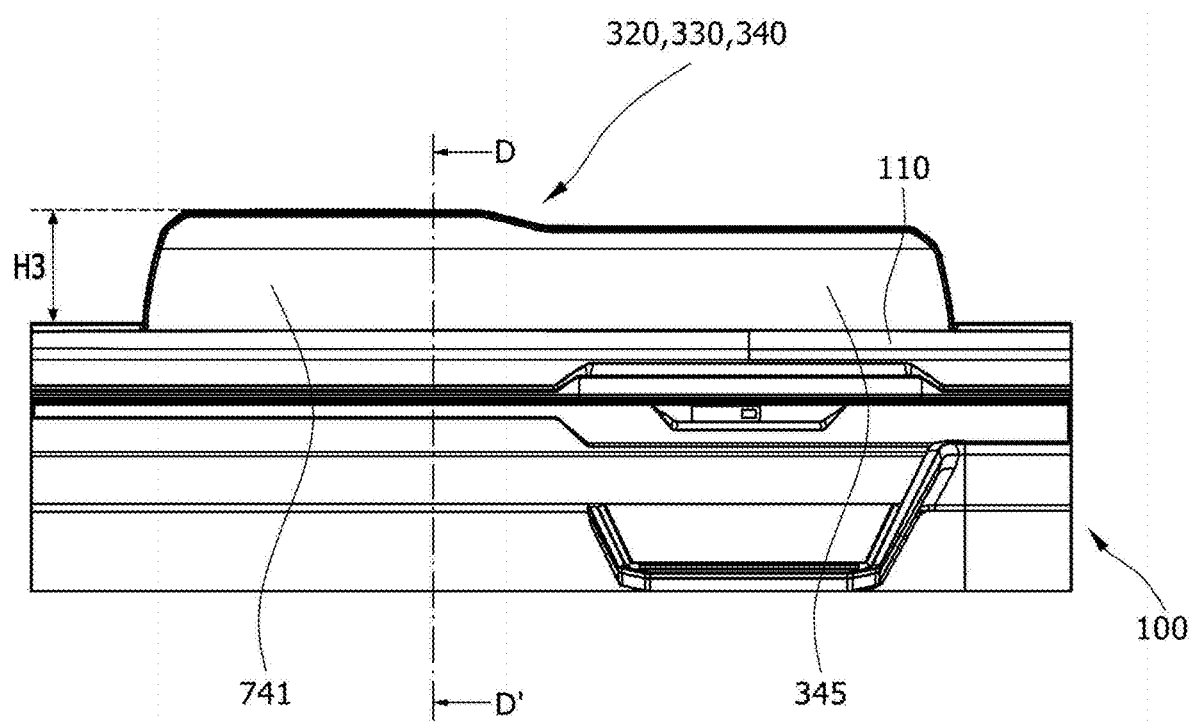
FIG. 16 is a front view schematically illustrating the display apparatus for a vehicle in an extension mode in an embodiment of the present disclosure.
Figure 17:
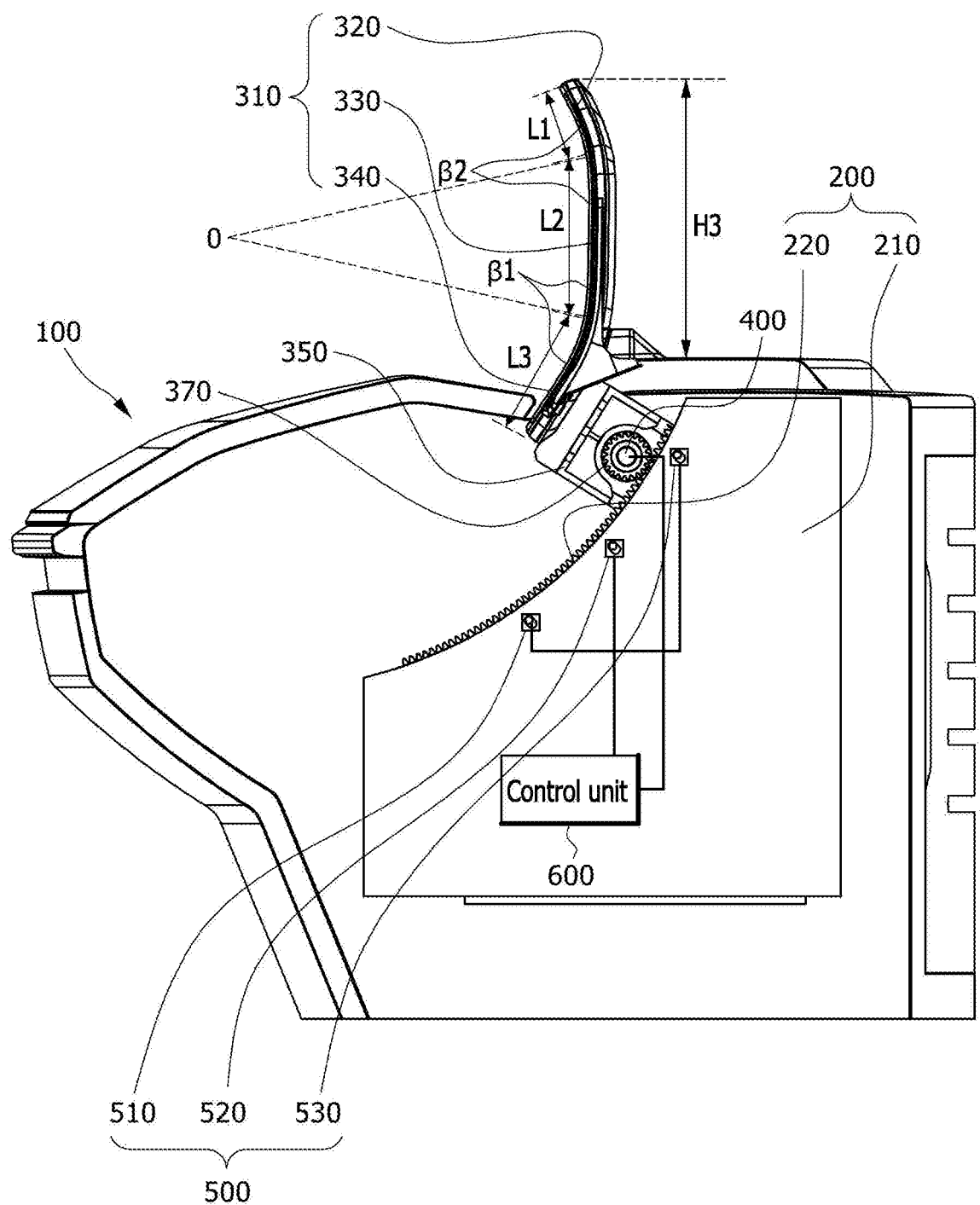
FIG. 17 is a diagram schematically illustrating a cross section taken along line D-D' in FIG. 16.
Figure 18:
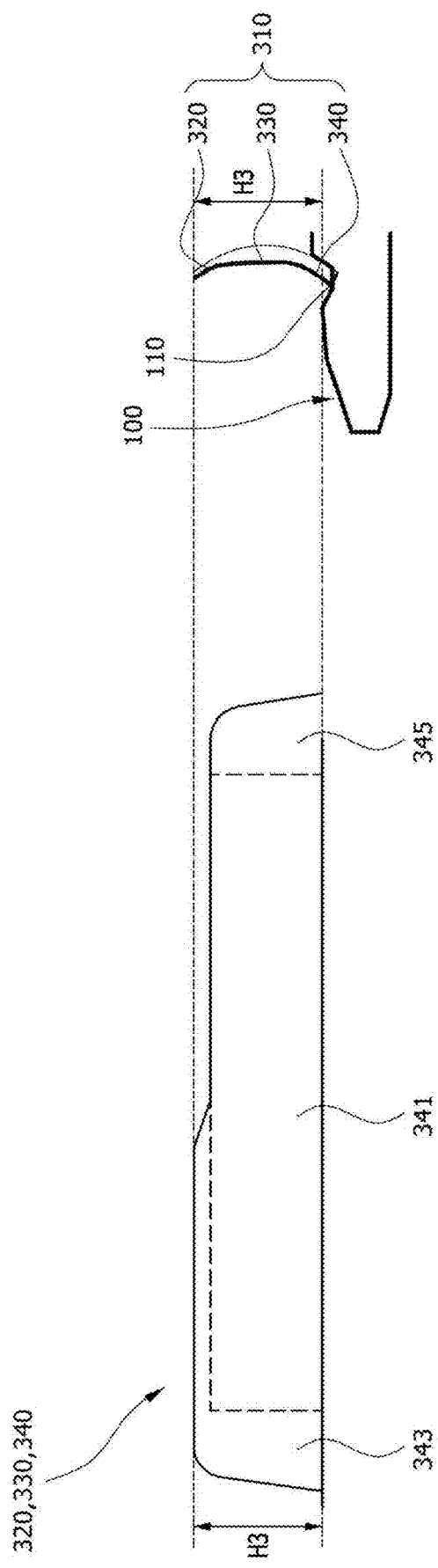
FIG. 18 is a diagram illustrating the protruding height of the display unit in the extension mode in an embodiment of the present disclosure.
Figure 19:
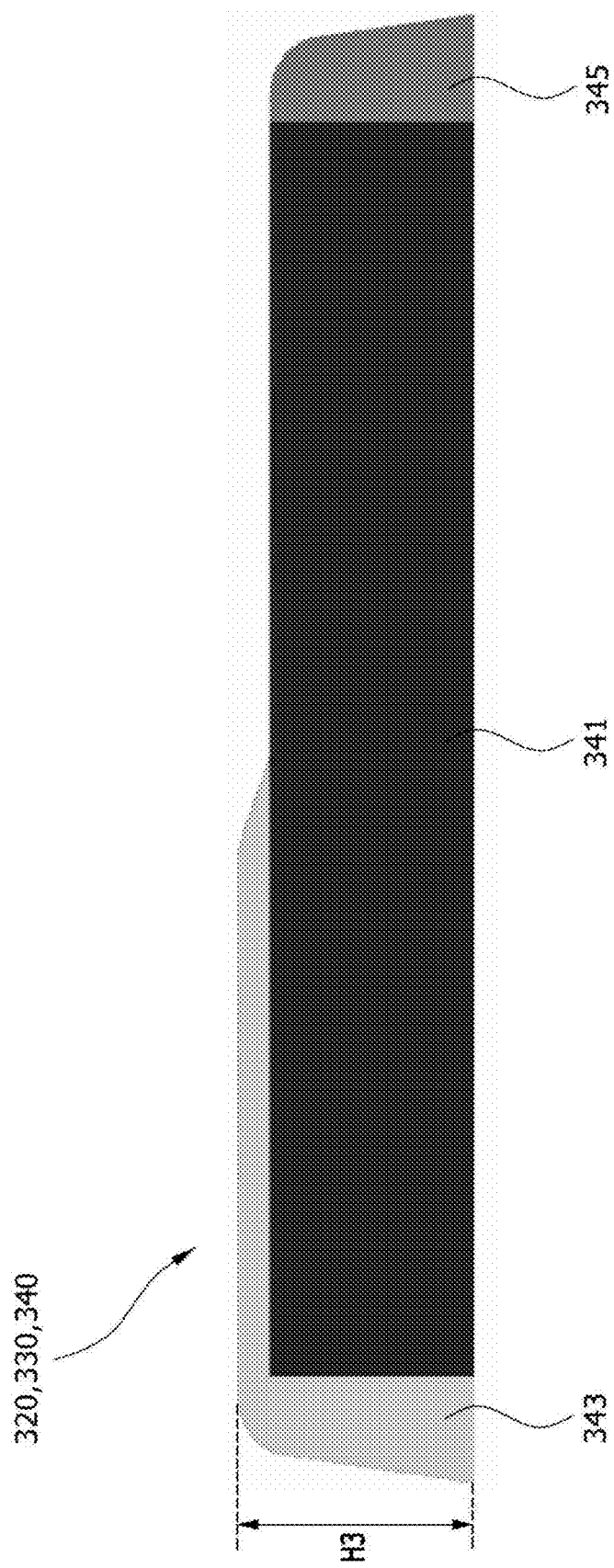
FIG. 19 is a diagram illustrating the deployment of the screen area of the display unit in the extension mode in an embodiment of the present disclosure.
Figure 20:
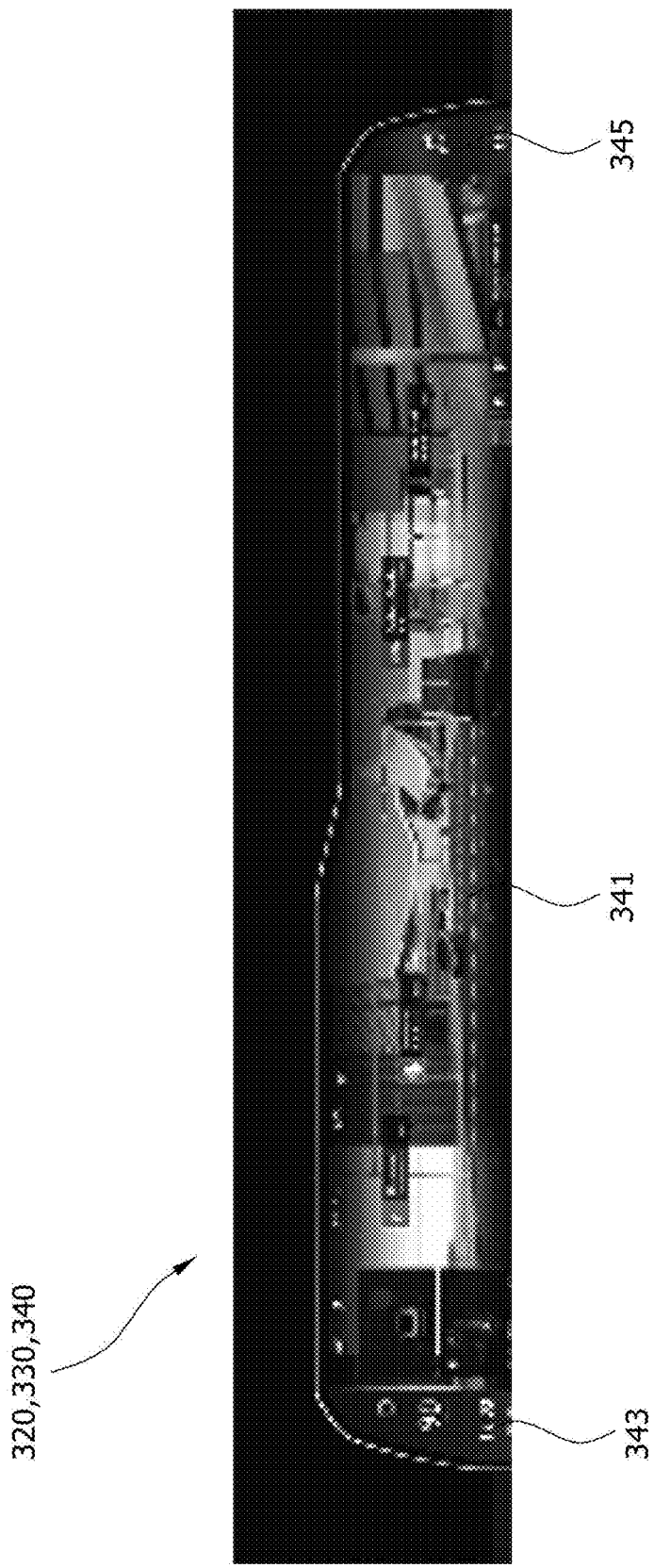
FIG. 20 is an exemplary diagram of information that is displayed in the screen area of the display unit in the extension mode in an embodiment of the present disclosure.
Figure 21:
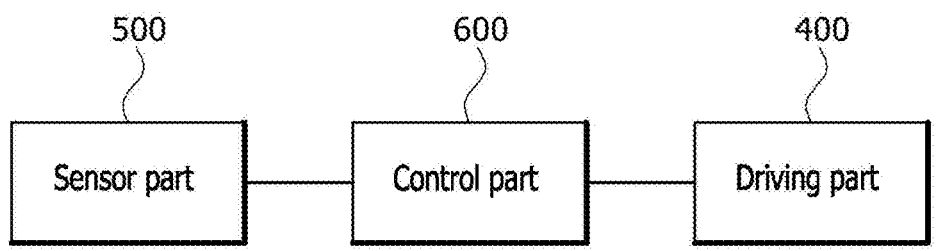
FIG. 21 is a block diagram illustrating a control flow in an embodiment of the present disclosure.

FIG. 1 is a front perspective view schematically illustrating a display apparatus for a vehicle according to an embodiment of the present disclosure. FIG. 2 is a perspective view schematically illustrating the display apparatus for a vehicle according to an embodiment of the present disclosure. FIG. 3 is a lateral cross-sectional view schematically illustrating the display apparatus for a vehicle according to an embodiment of the present disclosure. FIG. 4 is a lateral cross-sectional view schematically illustrating the state in which a display unit is rotated in a cockpit part in an embodiment of the present disclosure. FIG. 5 is a front view schematically illustrating the display apparatus for a vehicle in a reduction mode in an embodiment of the present disclosure. FIG. 6 is a diagram schematically illustrating a cross section taken along line A-A' in FIG. 5. FIG. 7 is a diagram schematically illustrating a cross section taken along line B-B' in FIG. 5. FIG. 8 is a diagram illustrating the protruding height of the display unit in the reduction mode in an embodiment of the present disclosure. FIG. 9 is a diagram illustrating the deployment of a screen area of the display unit in the reduction mode in an embodiment of the present disclosure. FIG. 10 is an exemplary diagram of information that is displayed in a screen area of the display unit in the reduction mode in an embodiment of the present disclosure. FIG. 11 is a front view schematically illustrating the display apparatus for a vehicle in a standard mode in an embodiment of the present disclosure. FIG. 12 is a diagram schematically illustrating a cross section taken along line C-C' in FIG. 11. FIG. 13 is a diagram illustrating the protruding height of the display unit in the standard mode in an embodiment of the present disclosure. FIG. 14 is a diagram illustrating the deployment of the screen area of the display unit in the standard mode in an embodiment of the present disclosure. FIG. 15 is an exemplary diagram of information that is displayed in the screen area of the display unit in the standard mode in an embodiment of the present disclosure. FIG. 16 is a front view schematically illustrating the display apparatus for a vehicle in an extension mode in an embodiment of the present disclosure. FIG. 17 is a diagram schematically illustrating a cross section taken along line D-D' in FIG. 16. FIG. 18 is a diagram illustrating the protruding height of the display unit in the extension mode in an embodiment of the present disclosure. FIG. 19 is a diagram illustrating the deployment of the screen area of the display unit in the extension mode in an embodiment of the present disclosure. FIG. 20 is an exemplary diagram of information that is displayed in the screen area of the display unit in the extension mode in an embodiment of the present disclosure. FIG. 21 is a block diagram illustrating a control flow in an embodiment of the present disclosure.

Referring to FIGS. 1 to 7, the display apparatus for a vehicle according to an embodiment of the present disclosure may include a cockpit part 100, a guide part 200, a display unit 300, and a driving part 400.

The cockpit part 100 is disposed in front of a passenger seat C in which a passenger who gets on a vehicle is seated. A handle for the steering of the vehicle, a speedometer for indicating the driving speed of the vehicle, a flowmeter for indicating the fuel state of the vehicle, etc. may be disposed in the cockpit part 100.

An opening 110 that is formed to be opened so that a display part 310 of the display unit 300 appears and disappears through the opening is provided in an upper surface of the cockpit part 100. The left and right width of the opening 110 is formed to be greater than the left and right width of the display part 310 so that the display part 310 appears and disappears through the opening.

The cockpit part 100 may further include a sealing part 120. The sealing part 120 is mounted on the circumference of the opening 110 and comes into contact with the display part 310. The sealing part 120 is formed to include an elastically deformable material.

The sealing part 120 prevents an alien substance, such as dust, from being introduced into the cockpit part 100 between the opening 110 and the display part 310.

The sealing part 120 may include a first sealing part 121 and a second sealing part 123.

The first sealing part 121 is mounted toward a front surface of the display part 310 on the opening 110. The second sealing part 123 is mounted toward a rear surface of the display part 310 on the opening 110. The first sealing part 121 and the second sealing part 123 can prevent an alien substance from being introduced through the opening 110 on the front surface and rear surface of the display part 310.

The guide part 200 is mounted within the cockpit part 100, and provides guidance to a movement of the display unit 300. The guide part 200 may include a guide body part 210 and a guide gear part 220.

The guide body part 210 is mounted on an internal space of the cockpit part 100, and is formed to have a curved surface that is concave toward the passenger seat C. A gear is formed in the guide gear part 220 along the curved surface of the guide body part 210 so that a moving path of a display gear part 370 of the display unit 300 is formed. The guide gear part 220 is engaged with the display gear part 370.

The guide gear part 220 is formed to have a curved shape that is downward concave when viewed from the side of the vehicle along the guide body part 210 formed to have the curved surface, so that the display part 310 of the display unit 300 is moved in a swivel moving way. In this case, the movement in the swivel moving way means that the display part is not moved in a straight line form, but the display part is moved as if the display part is rotated by using a rotation axis O illustrated in FIG. 3 as its center of rotation.

The display part 310 appears and disappears through the opening 110 while moving in a form in which the display part 310 is rotated around the virtual rotation axis O by the display gear part 370 that is moved along the guide gear part 220.

In the present embodiment, the guide body part 210 has been exemplified as having a curved surface shape. However, regardless of a shape of the guide body part 210, the guide gear part 220 may be formed to have a curved line shape that is downward concave when viewed from the side of the vehicle, and may implement a movement of the display gear part 370 that is engaged with the guide gear part 220 in a swivel moving way.

The display unit 300 is disposed within the cockpit part 100. The display unit 300 is moved along the guide part 200 so that a front surface of the display unit 300 from which a screen is output has a curved line-shaped moving path when viewed from the side of the vehicle, and appears to and disappears from the outside through the opening 110.

The display unit 300 is moved along the guide part 200 so that the display unit 300 comes from and goes to a plurality of points on the guide part 200. The protruding height of the display unit 300 that protrudes to the outside through the opening 110 is different at each of the plurality of points on the guide part 200.

The plurality of points on the guide part 200 at which the display unit 300 is moved on the guide part 200 corresponds to locations at which a first sensor part 510, second sensor part 520, and third sensor part 530 of a sensor part 500 to be described later are installed.

The display unit 300 may include the plurality of display parts 310 that outputs a screen including image information. The display parts 310 that neighbor each other are connected to form a set angle.

The plurality of display parts 310 may be connected and used as a multi-vision. Accordingly, the plurality of display parts 310 may provide one piece of image information to a passenger as one vision, or may be partitioned into a plurality of visions and simultaneously provide various pieces of image information to a passenger.

The display unit 300 may further include a display bracket part 350 and a display gear part 370.

The display bracket part 350 supports the display part 310. The display bracket part 350 supports one side (a lower side of the display part 310 in FIG. 6) of the display part 310. For example, the display bracket part 350 may support a third display part 340 that is disposed on the lower side among the plurality of display parts 310. The display bracket part 350 may support all of the display parts 310.

The display gear part 370 is rotatably mounted on the display bracket part 350, and is moved along the guide part 200 while being rotated by the driving part 400. The display gear part 370 has a gear formed in an outer side thereof, and is engaged with the guide gear part 220.

The display gear part 370 is axially connected to the driving part 400, and is moved along the guide gear part 220 while being rotated by an operation of the driving part 400. The height of the display part 310 that appears to and disappears from the outside through the opening 110 is adjusted based on the rotation direction and amount of rotation of the display gear part 370.

The driving part 400 provides electric power to the display unit 300 so that the display unit 300 is moved on the guide part 200. In the present disclosure, the driving part 400 may consist of a motor. The driving part 400 is axially connected to a central part of the display gear part 370, and rotates the display gear part 370.

Referring to FIGS. 3 to 20, the plurality of display parts 310 may include a first display part 320, a second display part 330, and the third display part 340.

The number of display parts 310 has been illustrated as being three, that is, the first display part 320, the second display part 330, and the third display part 340, but the present disclosure is not limited thereto. The plurality of display parts 310 may include two or four or more display parts that neighbor each other and that are consecutively connected.

In each of the plurality of display parts 310, a front surface from which a screen is output is formed of a plane. In this case, the front surface is a surface toward the passenger seat C in which a passenger who gets on the vehicle is seated. In the present embodiment, in each of the first display part 320, the second display part 330, and the third display part 340, the front surface from which a screen is output is formed of a plane.

The front surface of each of the first display part 320, the second display part 330, and the third display part 340 is formed of a plane. Accordingly, the display part can minimize the distortion of image information compared to a case in which the front surface is formed of a curved surface.

The number of plurality of points on the guide part 200 is identical with the number of the plurality of display parts 310.

In the present embodiment, the plurality of display parts 310 has been illustrated as including three display parts, that is, the first display part 320, the second display part 330, and the third display part 340. Accordingly, the number of plurality of points on the guide part 200 is set to 3 in accordance with the number of display parts 310.

In the present embodiment, the plurality of display parts 310 may include the first display part 320, the second display part 330, and the third display part 340.

The first display part 320 is formed to have a first upper and lower width L1. The first display part 320 protrudes to the outside through the opening 110 when the display gear part 370 reaches a first point on the guide part 200. In this case, the first point is set as a location of the first sensor part 510 of the sensor part 500 or a location corresponding to the location of the first sensor part 510 of the sensor part 500.

The second display part 330 is connected to the bottom of the first display part 320 and formed to have a second upper and lower width L2. The second display part 330 protrudes to the outside through the opening 110 when the display gear part 370 reaches a second point on the guide part 200. In this case, the second point is set as a location of the second sensor part 520 of the sensor part 500 or a location corresponding to the second sensor part 520 of the sensor part 500.

The third display part 340 is connected to the bottom of the second display part 330 and formed to have a third upper and lower width L3. The third display part 340 protrudes to the outside through the opening 110 when the display gear part 370 reaches a third point on the guide part 200. In this case, the third point is set as a location of the third sensor part 530 of the sensor part 500 or a location corresponding to the third sensor part 530 of the sensor part 500.

In the display apparatus for a vehicle according to an embodiment of the present disclosure, the protruding height of the display part 310 that protrudes to the outside through the opening 110 of the cockpit part 110 is adjusted in multiple stages depending on a plurality of display modes.

In the present embodiment, the display modes have been exemplified as being three modes, including a reduction mode, a standard mode, and an extension mode. FIG. 4 illustrates the deployment of the display parts 310 in the reduction mode, the standard mode, and the extension mode, respectively. In the display apparatus for a vehicle, the protruding height of the display part 310 is adjusted in three stages.

The reduction mode corresponds to the state in which the protruding height of the display part 310 is the lowest, and corresponds to the state in which the top of the display part 310 is the lowest location in FIG. 4. The extension mode corresponds to the state in which the protruding height of the display part 310 is the highest, and corresponds to the state in which the top of the display part 310 is the highest location in FIG. 4. The standard mode corresponds to the state in which the protruding height of the display part 310 is higher than that of the display part 310 in the reduction mode and lower than that of the display part 310 in the extension mode.

In the present embodiment, the reduction mode corresponds to the state in which only the first display part 320 has protruded from the cockpit part 100 to the outside. The standard mode corresponds to the state in which even the second display part 330, together with the first display part 320, has protruded from the cockpit part 100 to the outside. The extension mode corresponds to the state in which all of the first display part 320, the second display part 330, and the third display part 340 have protruded from the cockpit part 100 to the outside.

FIG. 3 illustrates the state in which the display part 310 has been disposed in the reduction mode. When the display part 310 is rotated around the virtual rotation axis O at an angle $\alpha 1$, the mode of the display part 310 changes into a display mode. When the display part 310 in the reduction mode is rotated at an angle $(\alpha 1 + \alpha 2)$, the mode of the display part 310 is changed into the extension mode. In this case, the angle $\alpha 1$ may be 17° to 23°, and the angle $\alpha 2$ may be 12° to 18°.

The second upper and lower width L2 of the second display part 330 may be formed to be wider than the first upper and lower width L1 of the first display part 320 and the third upper and lower width L3 of the third display part 340.

That is, the first display part 320 is formed to be narrower than the upper and lower width of the second display part 330. Accordingly, in the reduction mode, a degree that the display unit 300 hides a front field of vision of a passenger can be minimized because only the first display part 320 protrudes through the opening 110 and outputs a screen.

Furthermore, the upper and lower width of the second display part 330 is the greatest. Accordingly, in the standard mode, various types of information or content can be smoothly provided through a sufficient screen size. In the extension mode, a large-sized screen can be provided through an infortainment function including a cinema mode.

In the extension mode, an angle of the second display part 330, which is formed along with a road surface, may be 85° to 100°. In the present embodiment, in the extension mode, the second display part 330 is disposed to form an angle of approximately 90° along with a road surface. Accordingly, in the extension mode, a front surface of the second display part 330 that provides the greatest screen area is perpendicular or almost perpendicular to a gaze direction of a passenger, thereby improving watching convenience.

Referring to FIG. 8, the height of the first display part 320 that protrudes to the outside through the opening 110 is H1. The first display part 320 appears from and disappears into the cockpit part 100 through the opening 110 while being moved in a swivel moving way. Accordingly, the height H1 of the first display part 320 that protrudes to the outside through the opening 110 is smaller than the first upper and lower width L1, that is, the upper and lower width of the first display part 320 (H1<L1).

Accordingly, a space that forms a moving path when the first display part 320 moves in the internal space of the cockpit part 100 can be reduced because the display unit 300 is moved in a swivel moving way, compared to a conventional pop-up way in which the display part appears and disappears in a direction perpendicular to a road surface.

The display gear part 370 of the display unit 300 is engaged with the guide gear part 220 of the guide part 200. The display gear part 370 is moved along the guide gear part 220 having a curved shape, which has been engaged therewith by being rotated by an operation of the driving part 400, so that the display part 310 appears and disappears through the opening 110.

Referring to FIGS. 11 and 12, the height of the first display part 320 and the second display part 330 that protrude to the outside through the opening 110, among the plurality of display parts 310, is H2. The first display part 320 and the second display part 330 appear from and disappear into the cockpit part 100 through the opening 110 while being moved in a swivel moving way. Accordingly, the height H2 of the first display part 320 and the second display part 330 that protrude to the outside through the opening 110 is smaller than the sum (L1+L2) of the first upper and lower width L1 of the first display part 320 and the second upper and lower width L of the second display part 330 (H2<L1+L2).

Accordingly, a space that forms a moving path when the first display part 320 and the second display part 330 are moved in the internal space of the cockpit part 100 can be reduced because the display unit 300 is moved in a swivel moving way compared to a conventional pop-up way in which the display unit appears and disappears in a direction perpendicular to a road surface.

Referring to FIGS. 16 and 17, the height of the first display part 320, the second display part 330, and the third display part 340 that protrude to the outside through the opening 110, among the plurality of display parts 310, is H3. The first display part 320, the second display part 330, and the third display part 340 appear from and disappear into the cockpit part 100 through the opening 110 while being moved in a swivel moving way. Accordingly, the height H3 of the first display part 320, the second display part 330, and the third display part 340 that protrude to the outside through the opening 110 is smaller than the sum (L1+L2+L3) of the first upper and lower width L1 of the first display part 320, the second upper and lower width L2 of the second display part 330, and the third upper and lower width L3 of the third display part 340 (H3<L1+L2+L3).

Accordingly, a space that forms a moving path when the first display part 320, the second display part 330, and the third display part 340 are moved in the internal space of the cockpit part 100 can be reduced because the display unit 300 is moved in a swivel moving way, compared to a conventional pop-up way in which the display part appears and disappears in a direction perpendicular to a road surface.

Referring to FIG. 17, an angle that is formed by the front surface of the second display part 330 having the plane and a front surface of the third display part 340 having the plane is (31. An angle that is formed by a front surface of the first display part 320 having the plane and the front surface of the second display part 330 having the plane is (32. In the present embodiment, the angle (31 may be 140° to 150°, and the angle (32 may be 145° to 155°.

The angle (32 may be greater than the angle (31. The third display part 340 is in the state in which the third display part 340, among the plurality of display parts 310, has been disposed at the lowest location, and an eye of a passenger is placed over the third display part 340. Accordingly, the bent angle (32 of the third display part 340 is greater than the bent angle (31 of the first display part 320 so that the passenger can fully view a screen of the third display part 340 in the extension mode.

Furthermore, the first display part 320 is in the state in which the first display part 320, among the plurality of display parts 310, is disposed at the highest location, and an eye of a passenger is almost parallel to the first display part 320 in the extension mode. Accordingly, the bent angle β1 of the first display part 320 is smaller than the bent angle β2 of the third display part 340 so that a screen blind spot does not occur even in the extension mode.

The first display part 320, the second display part 330, and the third display part 340 may be connected in the form of a curved surface. Accordingly, a sense of alienation in a screen area that is formed by the first display part 320 and the second display part 330 in the standard mode and a screen area that is formed by the first display part 320, the second display part 330, and the third display part 340 in the extension mode can be removed.

A rear surface of each of the first display part 320, the second display part 330, and the third display part 340 has a curved surface. Accordingly, although the display part 310 is moved in a swivel moving way, an interval between the rear surface of the display part 310 and the opening 100 can be constantly maintained.

The display apparatus for a vehicle according to an embodiment of the present disclosure further includes the sensor part 500 and a control part 600.

Referring to FIGS. 6 and 21, the sensor part 500 is disposed in the guide body part 210 in a plural number along the guide gear part 220, and detects a location of the display unit 300. The number of plurality of sensor parts 500 may be the same as the number of plurality of display parts 310.

The sensor part 500 includes the first sensor part 510, the second sensor part 520, and the third sensor part 530. The first sensor part 510, the second sensor part 520, and the third sensor part 530 are disposed at different heights along the guide gear part 220.

The control part 600 controls an operation of the driving part 400 in response to a detection signal from the sensor part 500.

The control part 600 operates the driving part 400 when receiving a reduction mode (or simple mode) command from a passenger, and stops the operation of the driving part 400 when receiving a detection signal, indicating that the display gear part 370 has reached the first point on the guide part 200, from the first sensor part 510. Accordingly, a movement of the display part 310 is stopped, so that the reduction mode in which only the first display part 320 protrudes to the outside through the opening 110 is implemented.

The control part 600 operates the driving part 400 when receiving a standard mode (or normal mode) command from a passenger, and stops the operation of the driving part 400 when receiving a detection signal, indicating that the display gear part 370 has reached the second point on the guide part 200, from the second sensor part 520. Accordingly, a movement of the display part 310 is stopped, so that the standard mode in which even the second display part 330, together with the first display part 320, protrudes to the outside through the opening 110 is implemented.

The control part 600 operates the driving part 400 when receiving an extension mode (or full mode) command from a passenger, and stops the operation of the driving part 400 when receiving a detection signal, indicating that the display gear part 370 has reached the third point on the guide part 200, from the third sensor part 540. Accordingly, a movement of the display part 310 is stopped, so that the extension mode in which even the third display part 340, together with the first display part 320 and the second display part 330, has protruded to the outside through the opening 110 is implemented.

An operation of the display part 310 protruding in the display apparatus for a vehicle according to an embodiment of the present disclosure is described.

Referring to FIGS. 5 to 10, when receiving the reduction mode command, the control part 600 drives and controls the display gear part 370 so that the display gear part 370 reaches the first point on the guide part 200. Accordingly, the first display part 320 protrudes to the outside through the opening 110, and the second display part 330 and the third display part 340 are disposed within the cockpit part 100. When the standard mode or the extension mode is changed into the reduction mode, the display part 310 moves in a direction in which the display part 310 enters the opening 110.

In the reduction mode, only the first display part 320, among the plurality of display parts 310, protrudes from the opening 110 to the outside, and the second display part 330 and the third display part 340 are disposed within the cockpit part 100.

In the reduction mode, a screen area that is formed by the first display part 320 includes a reduction cluster display part 321 and a reduction infortainment display part 323. In FIG. 8, the left and right width of the reduction cluster display part 321 is set as W1, and the left and right width of the reduction infortainment display part 323 is set as W2. W1 and W2 may be the same length, and may be differently set based on screen output information.

The reduction cluster display part 321 may display at least any one of a driving environment, navigation information, and a speedometer on one side (a left side in FIG. 9) of the screen area of the first display part 320.

The reduction infortainment display part 323 may display infortainment content information on the other side (a right side in FIG. 9) of the screen area of the first display part 320 in an icon form. The infortainment content information of the reduction infortainment display part 323 may include a music playback state, a call state, a messenger state, an SNS state, and time information.

An icon in the reduction infortainment display part 323 is arranged in a plural number in the length direction (i.e., a horizontal direction in FIG. 9) of the reduction infortainment display part 323. The title or lyrics of music that are listening may be displayed on the reduction infortainment display part 323.

As time information is displayed on the reduction cluster display part 321 as in FIG. 10, various types of information that are provided by the reduction cluster display part 321 and the reduction infortainment display part 323 may be changed.

Power consumption of the display part 310 in the reduction mode is smaller than that of the display part 310 in the standard mode or the extension mode. Accordingly, a passenger can reduce power consumption by setting a display mode as the reduction mode if the amount of power of a vehicle is not sufficient or it is necessary to reduce power.

Referring to FIGS. 11 to 15, when receiving the standard mode command, the control part 600 drives and controls the display gear part 370 so that the display gear part 370 reaches the second point on the guide part 200. Accordingly, the first display part 320 and the second display part 330 protrude to the outside through the opening 110, and the third display part 340 is disposed within the cockpit part 100.

In the standard mode, the first display part 320 and the second display part 330, among the plurality of display parts 310, protrude to the outside through the opening 110, and the third display part 340 is disposed within the cockpit part 100.

The screen area that is formed by the first display part 320 and the second display part 330 that have protruded to the outside through the opening 110 in the standard mode includes a standard cluster display part 331 and a standard infortainment display part 333.

The standard cluster display part 331 may display at least any one of a driving environment, navigation information, and a speedometer on one side (a left side in FIG. 14) of the screen area of the first display part 320 and the second display part 330 in a graphic form. The standard cluster display part 331 may display the same information as the reduction cluster display part 321 more specifically by using the graphic form.

The standard infortainment display part 333 may display infortainment content on the other side (a right side in FIG. 14) of the screen area of the first display part 320 and the second display part 330 in a graphic form. The infortainment content of the standard infortainment display part 333 includes call-related content, message-related content, SNS-related content, and time information, in addition to music content and video content including a movie. The standard infortainment display part 333 displays more detailed information than the reduction infortainment display part 323.

Image information that is provided by the standard cluster display part 331 and image information that is provided by the standard infortainment display part 333 may be exchanged.

Referring to FIGS. 16 to 20, when receiving the extension mode command, the control part 600 drives and controls the display gear part 370 so that the display gear part 370 reaches the third point on the guide part 200. Accordingly, the first display part 320, the second display part 330, and the third display part 340 protrude to the outside through the opening 110.

In the extension mode, the first display part 320, the second display part 330, and the third display part 340, among the plurality of display parts 310, protrude to the outside through the opening 110, so that a part of a lower side of the third display part 340 is disposed within the cockpit part 100.

The screen area that is formed by the first display part 320, the second display part 330, and the third display part 340 that have protruded to the outside through the opening 110 in the extension mode includes a main infortainment display part 341, an extension cluster display part 343, and a sub-infortainment display part 345.

The main infortainment display part 341 displays an infortainment image, for example, a full image in a central part (on the basis of FIG. 19) of the screen area that is formed by the first display part 320, the second display part 330, and the third display part 340. The main infortainment display part 341 is formed to be wider than each of the extension cluster display part 343 and the sub-infortainment display part 345 in the screen area of the first display part 320, the second display part 330, and the third display part 340. The main infortainment display part 341 may provide a full image of video including a movie, a full navigation mode, or a full image of infortainment content.

The extension cluster display part 343 may display at least any one of a driving environment, a vehicle state, and a speedometer on one side (a left side in FIG. 19) of the main infotainment display part 341 in the screen area of the first display part 320, the second display part 330, and the third display part 340.

The sub-infotainment display part 345 may display infotainment content information on the other side (a right side in FIG. 19) of the main infotainment display part 341 in an icon form or in a graphic form in the screen area of the first display part 320, the second display part 330, and the third display part 340.

Screen output information that is provided by the extension cluster display part 343 and screen output information that is provided by the sub-infotainment display part 345 may be exchanged.

Figure 22:
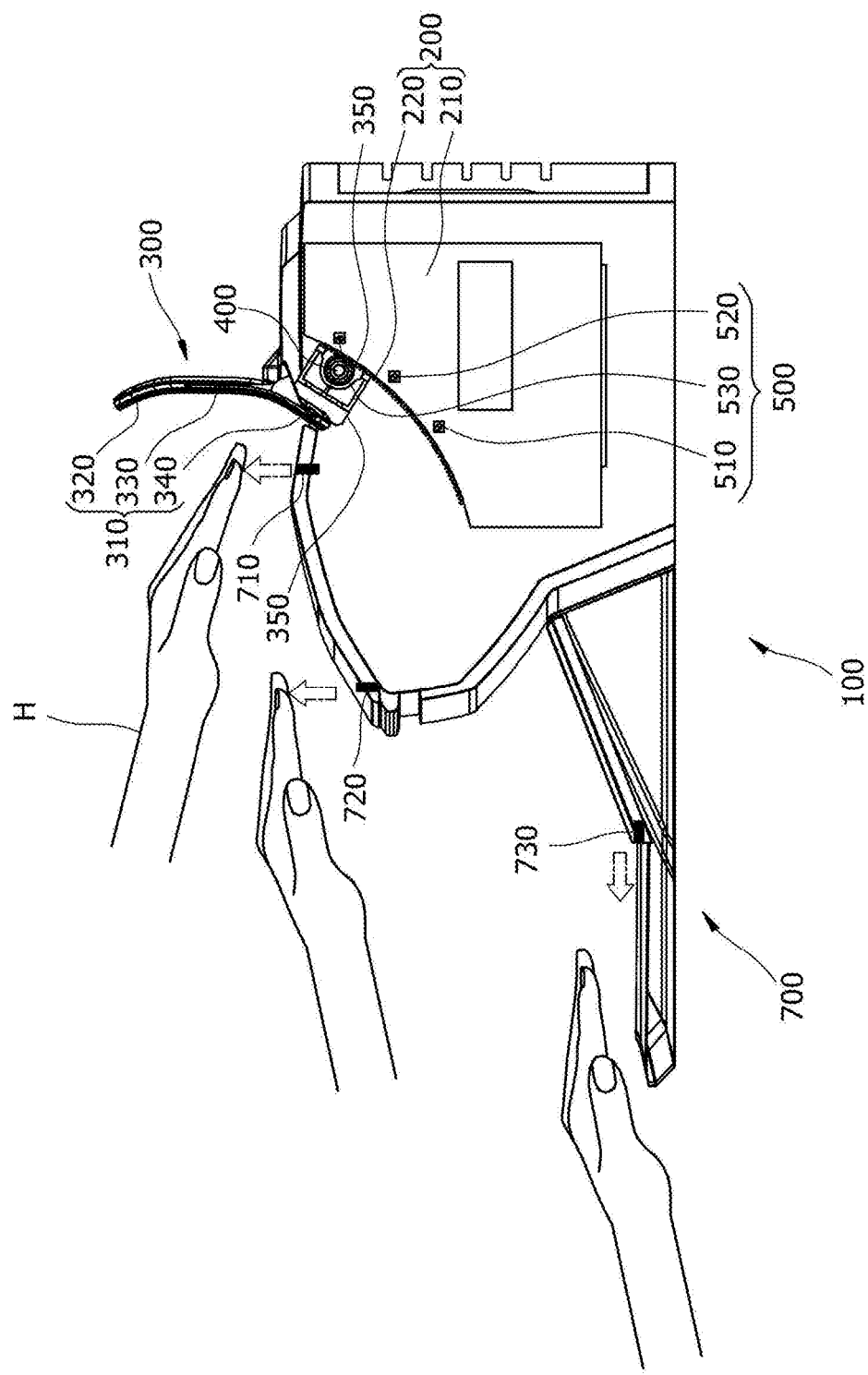
FIG. 22 is a diagram illustrating an operating state of an air gesture detection part in the display apparatus for a vehicle according to an embodiment of the present disclosure.
Figure 23:
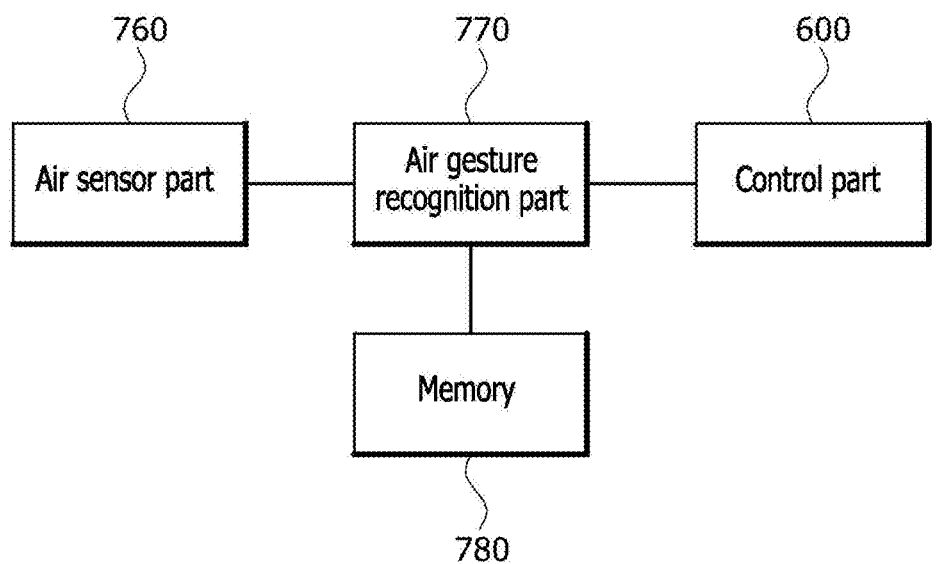
FIG. 23 is a block diagram illustrating a control flow of the air gesture detection part according to an embodiment of the present disclosure.

FIG. 22 is a diagram illustrating an operating state of the air gesture detection part in the display apparatus for a vehicle according to an embodiment of the present disclosure. FIG. 23 is a block diagram illustrating a control flow of the air gesture detection part according to an embodiment of the present disclosure.

Referring to FIGS. 1, 2, 22, and 23, the display apparatus for a vehicle according to an embodiment of the present disclosure may include one or more air gesture detection parts. The air gesture detection part is installed in the cockpit part 100, and detects a movement of a passenger.

The control part 600 controls an operation of the display unit 300 in response to a gesture signal from the air gesture detection part.

The air gesture detection part may include a first air gesture detection part 710, a second air gesture detection part 720, and a third air gesture detection part 730. In the present embodiment, the air gesture detection part has been exemplified as including the three air gesture detection parts, but may include one or two or more air gesture detection parts.

If the plurality of air gesture detection parts is included, the air gesture detection parts are divided and installed in a plurality of places, respectively, on the cockpit part 100. Accordingly, the display apparatus for a vehicle may recognize a movement of a passenger at each of the plurality of places, and may control an operation of a display screen of the display unit 300 based on the recognized movement.

The first air gesture detection part 710 is installed at the top of the cockpit part 100 through which the display unit 300 appears and disappears. The first air gesture detection part 710, among the plurality of air gesture detection parts, is disposed to be closest to the display unit 300. The first air gesture detection part 710 may be disposed in front of the display unit 300. In this case, the front means a front (a left side in FIG. 22) in a direction in which the cockpit part 100 is directed toward the passenger, not a front (a right side in FIG. 22) in a direction in which the vehicle travels.

The passenger can reduce the occurrence of a health and hygiene problem, such as a virus infection according to direct contact with the display unit 300 because the passenger can manipulate the display unit 300 through the first air gesture detection part 710 in a contactless way. The passenger may check a situation, which is manipulated through the first air gesture detection part 710, through a screen area of the display part 310 in real time.

The first air gesture detection part 710 is disposed in a central part of the cockpit part 100 in a horizontal direction thereof. As illustrated in FIG. 1, the display unit 300 is disposed to be inclined toward one side (a left side in FIG. 1) of the cockpit part 100. In contrast, the first air gesture detection part 710 is disposed at the central part of the cockpit part 100.

Accordingly, both a passenger who is seated in a left passenger seat C and a passenger who is seated in a right passenger seat C in FIG. 2 can easily access and use the first air gesture detection part 710.

The first air gesture detection part 710 scans a movement of a passenger over the first air gesture detection part 710. Referring to FIG. 22, the passenger makes a gesture of manipulating the display unit 300 while moving his or her hand upward from the first air gesture detection part 710. That is, a direction in which the first air gesture detection part 710 is recognized is an upper side. In order to increase the recognition rate of the hand movement, the first air gesture detection part 710 is installed to be exposed to the outside of the cockpit part 100 in a direction that faces the direction in which the first air gesture detection part 710 is recognized.

The first air gesture detection part 710 may be integrally formed with the cockpit part 100. The first air gesture detection part 710 may have a left and right width of 30 cm to 40 cm and a front and back width of 1 cm to 2 cm. The first air gesture detection part 710 may be a hovering gesture recognition type air gesture detection part so that the first air gesture detection part 710 can recognize a hovering gesture.

The second air gesture detection part 720 is installed at the front of the cockpit part 100 so that the second air gesture detection part 720 is closer to the passenger than the first air gesture detection part 710. In this case, the front means a side (a left side in FIG. 22) in which the cockpit part 100 is directed toward the passenger. Accordingly, the passenger can manipulate the display unit 300 by using the second air gesture detection part 720 even without stretching his or her hand up to the first air gesture detection part 710.

The passenger can manipulate the display unit 300 through the second air gesture detection part 720 in a contactless way. Accordingly, the occurrence of a health and hygiene problem, such as a virus infection attributable to direct contact with the display unit 300, can be reduced. The passenger may check a situation, which is manipulated through the second air gesture detection part 720, through the screen area of the display part 310 in real time.

As illustrated in FIG. 1, the second air gesture detection part 720 is disposed at the central part of the cockpit part 100 in the horizontal direction thereof. Accordingly, both a passenger who is seated in the left passenger seat C and a passenger who is seated in the right passenger seat C in FIG. 2 can easily access and use the second air gesture detection part 720.

The second air gesture detection part 720 scans a movement of a passenger over the second air gesture detection part 720. Referring to FIG. 22, the passenger makes a gesture of manipulating the display unit 300 while moving his or her hand upward from the second air gesture detection part 720. That is, a direction in which the second air gesture detection part 720 is recognized is an upper side. In order to increase the recognition rate of the hand movement, the second air gesture detection part 720 is installed to be exposed to the outside of the cockpit part 100 in the direction that faces the direction in which the second air gesture detection part 720 is recognized.

The second air gesture detection part 720 may be integrally formed with the cockpit part 100. The second air gesture detection part 720 may have a left and right width of 30 cm to 40 cm and a front and back width of 1 cm to 2 cm. The second air gesture detection part 720 may be a hovering gesture recognition type air gesture detection part so that the second air gesture detection part 720 can recognize a hovering gesture.

The third air gesture detection part 730 is installed in a central partition part 150 of the cockpit part 100. The central partition part 150 is formed at the central part of the cockpit part 100 in a way to protrude from the cockpit part 100 so that the central partition part 150 partitions the left passenger seat C and the right passenger seat C.

The third air gesture detection part 730, among the plurality of air gesture detection parts, is disposed to be closest to the passenger. Furthermore, since the central partition part 150 is disposed in an area lower than another area of the cockpit part 100, the passenger can conveniently manipulate the display unit 300 at a low location even without stretching his or her hand far away. In particular, if a passenger drives, the use of the third air gesture detection part 730 is also of help in safe driving.

The passenger can manipulate the display unit 300 through the third air gesture detection part 730 in a contactless way. Accordingly, the occurrence of a health and hygiene problem, such as a virus infection attributable to direct contact with the display unit 300, can be reduced. The passenger may check a situation, which is manipulated through the third air gesture detection part 730, through the screen area of the display part 310 or a projector display part 735 in real time. The projector display part 735 may be installed on the central partition part 150, and may output information that is the same as or different from information output by the display part 310.

As illustrated in FIG. 1, the third air gesture detection part 730 is disposed in the central partition part 150 that is disposed at the central part of the cockpit part 100 in the horizontal direction thereof. Accordingly, both a passenger who is seated in the left passenger seat C and a passenger who is seated in the right passenger seat C in FIG. 2 can easily access and use the third air gesture detection part 730.

The third air gesture detection part 730 scans a movement of the passenger in front of the third air gesture detection part 730. Referring to FIG. 22, the passenger makes a gesture of manipulating the display unit 300 while moving his or her hand in front of the third air gesture detection part 730. That is, a direction in which the third air gesture detection part 730 is recognized is ahead of the third air gesture detection part 730. In order to increase the recognition rate of the hand movement, the third air gesture detection part 730 is installed to be exposed to the outside of the cockpit part 100 in the direction that faces the direction in which the third air gesture detection part 730 is recognized.

The third air gesture detection part 730 may be integrally formed with the cockpit part 100. The third air gesture detection part 730 may have a left and right width of 30 cm to 40 cm and a front and back width of 1 cm to 2 cm. The third air gesture detection part 730 may be a hovering gesture recognition type air gesture detection part so that the third air gesture detection part 730 can recognize a hovering gesture.

Each of the first air gesture detection part 710, the second air gesture detection part 720, and the third air gesture detection part 730 may include an air sensor part 760 and an air gesture recognition part 770.

The air sensor part 760 scans a movement of a passenger, and the air gesture recognition part 770 recognizes an air gesture corresponding to the movement of the passenger. The control part 600 controls an operation of a display screen of the display unit 300 in response to the air gesture recognized by the air gesture recognition part 770.

The air sensor part 760 generates a movement image corresponding to an air gesture by scanning a movement of a passenger (or driver or user), that is, the air gesture. The air sensor part 760 may be a color camera, an infrared camera, a depth camera, a stereo camera, or an RGB-D camera. In this case, the movement of the passenger is defined as a concept that includes another movement of the body other than a hand movement of the passenger.

The air gesture recognition part 770 recognizes an air gesture of a passenger, for example, a hand movement of the passenger by processing a movement image received from the air sensor part 760.

When receiving a movement image corresponding to an air gesture of a passenger from the air sensor part 760, the air gesture recognition part 770 may perform pre-processing processes, such as slant corrections, deskewing, denosing, thinning, and contour smoothing. In this case, each of the pre-processing processes is an already known technology in the image processing field, and a detailed description thereof is omitted.

In order to recognize an air gesture of a passenger, the air gesture recognition part 770 extracts a movement pattern corresponding to the air gesture of the passenger from a pre-processed movement image, and recognizes the air gesture of the passenger corresponding to the extracted movement pattern by comparing the extracted movement pattern and a gesture pattern that has been stored in the memory 780. The movement pattern corresponding to the air gesture of the passenger may include a movement pattern related to another body action in addition to a movement pattern related to a hand movement.

In order to extract a movement pattern related to a hand movement from a pre-processed movement image, the air gesture recognition part 770 may extract a feature vector related to an outer shape of a hand in a frame unit, may calculate a difference value between a feature vector extracted from a previous frame and a feature vector extracted from a current frame, and may extract the movement pattern related to the hand movement based on the calculated difference value.

As a method of extracting a feature vector related to an outer shape of a hand from a pre-processed movement image, a known image processing algorithm, such as an object extraction algorithm or a background removal algorithm, may be used. The present disclosure is not characterized in limiting such an image processing algorithm, and a detailed description thereof is replaced with a known technology.

The control part 600 controls a screen configuration that is displayed on the display part 310, based on the results of the recognition of an air gesture of a passenger that is recognized by the air gesture recognition part 770. That is, the control part 600 may control the construction and operation of the screen area that is formed by the first display part 320 when the reduction mode is executed, may control the construction and operation of the screen area that is formed by the first display part 320 and the second display part 330 when the standard mode is executed, and may control the construction and operation of the screen area that is formed by the first display part 320, the second display part 330, and the third display part 340 when the extension mode is executed.

The control part 600 may be constructed to include at least one graphic processor. When the reduction mode is executed, the control part 600 may move a screen configuration that is displayed on the reduction cluster display part 321 to a screen of the reduction infortainment display part 323, or may move a screen configuration that is displayed on the reduction infortainment display part 323 to a screen of the reduction cluster display part 321.

When the standard mode is executed, the control part 600 may move a screen configuration that is displayed on the standard cluster display part 331 to a screen of the standard infortainment display part 333, or may move a screen configuration that is displayed on the standard infortainment display part 333 to a screen of the standard cluster display part 331.

Furthermore, when the extension mode is executed, the control part 600 may move a screen configuration that is displayed on the extension cluster display part 343 to a screen of the sub-infortainment display part 345, or may move a screen configuration that is displayed on the sub-infortainment display part 345 to a screen of the extension cluster display part 343.

Figure 24:
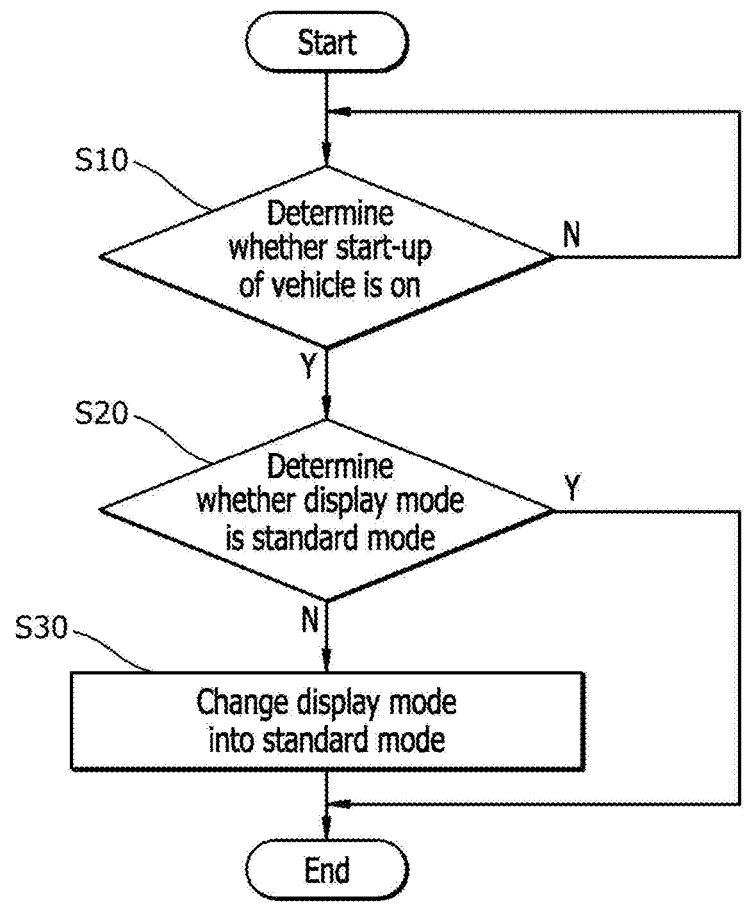
FIG. 24 is a diagram illustrating a control flow in the state in which the start-up of a vehicle has become on in the display apparatus for a vehicle according to an embodiment of the present disclosure.
Figure 25:
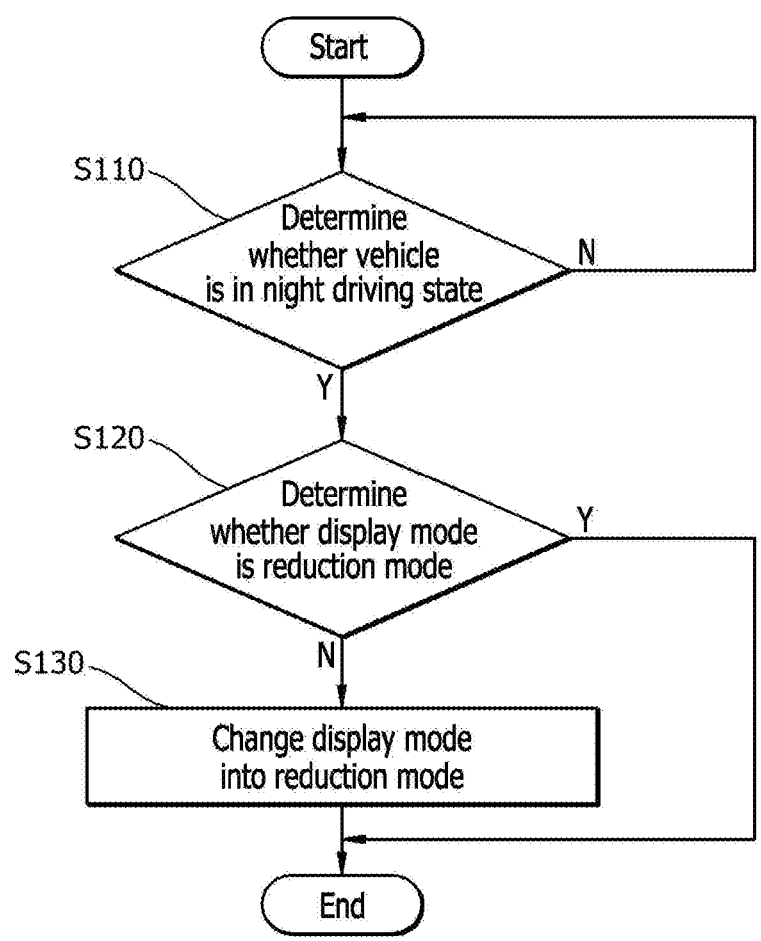
FIG. 25 is a diagram illustrating a control flow when a vehicle is in a night driving state in the display apparatus for a vehicle according to an embodiment of the present disclosure.
Figure 26:
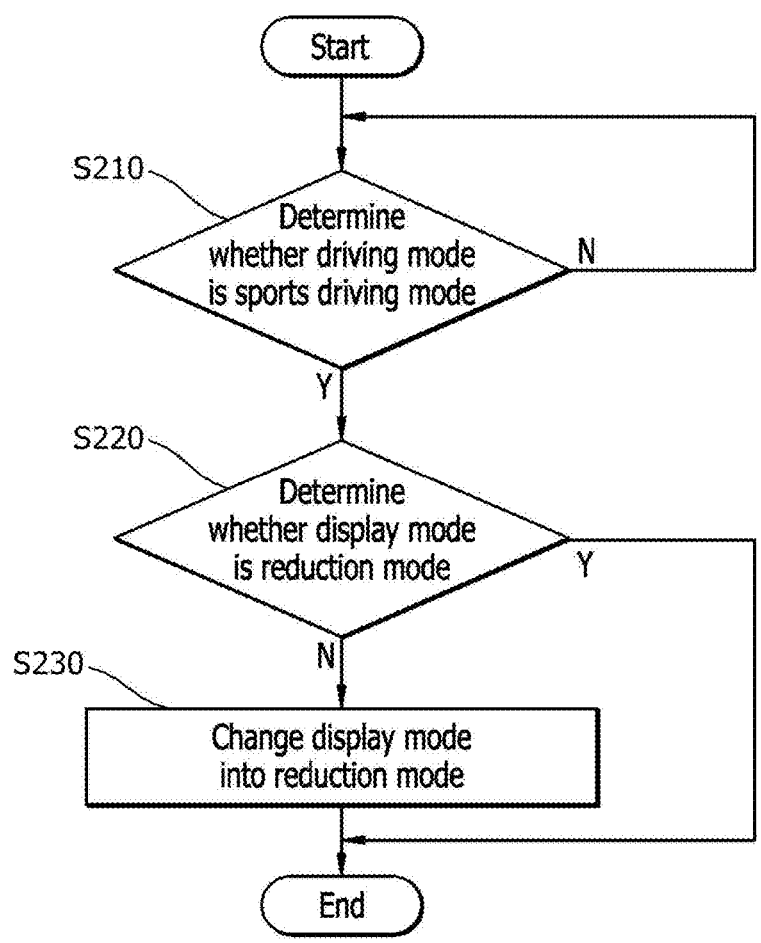
FIG. 26 is a diagram illustrating a control flow when a vehicle is in a sports driving mode in the display apparatus for a vehicle according to an embodiment of the present disclosure.
Figure 27:
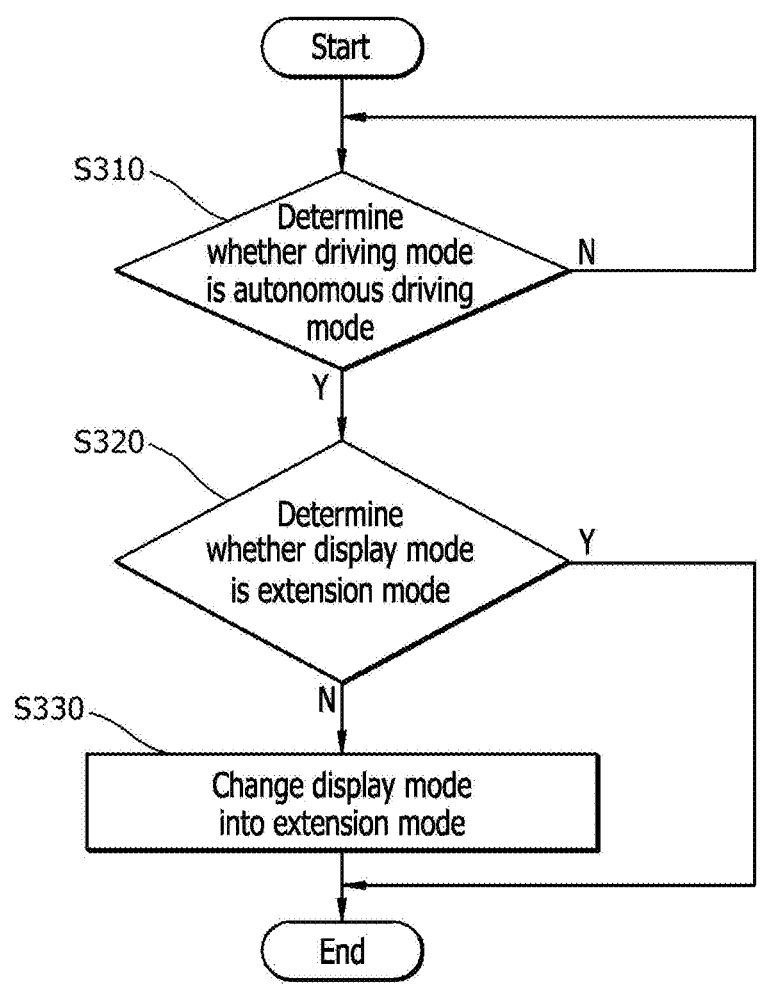
FIG. 27 is a diagram illustrating a control flow when a vehicle is in an autonomous driving mode in the display apparatus for a vehicle according to an embodiment of the present disclosure.
Figure 28:
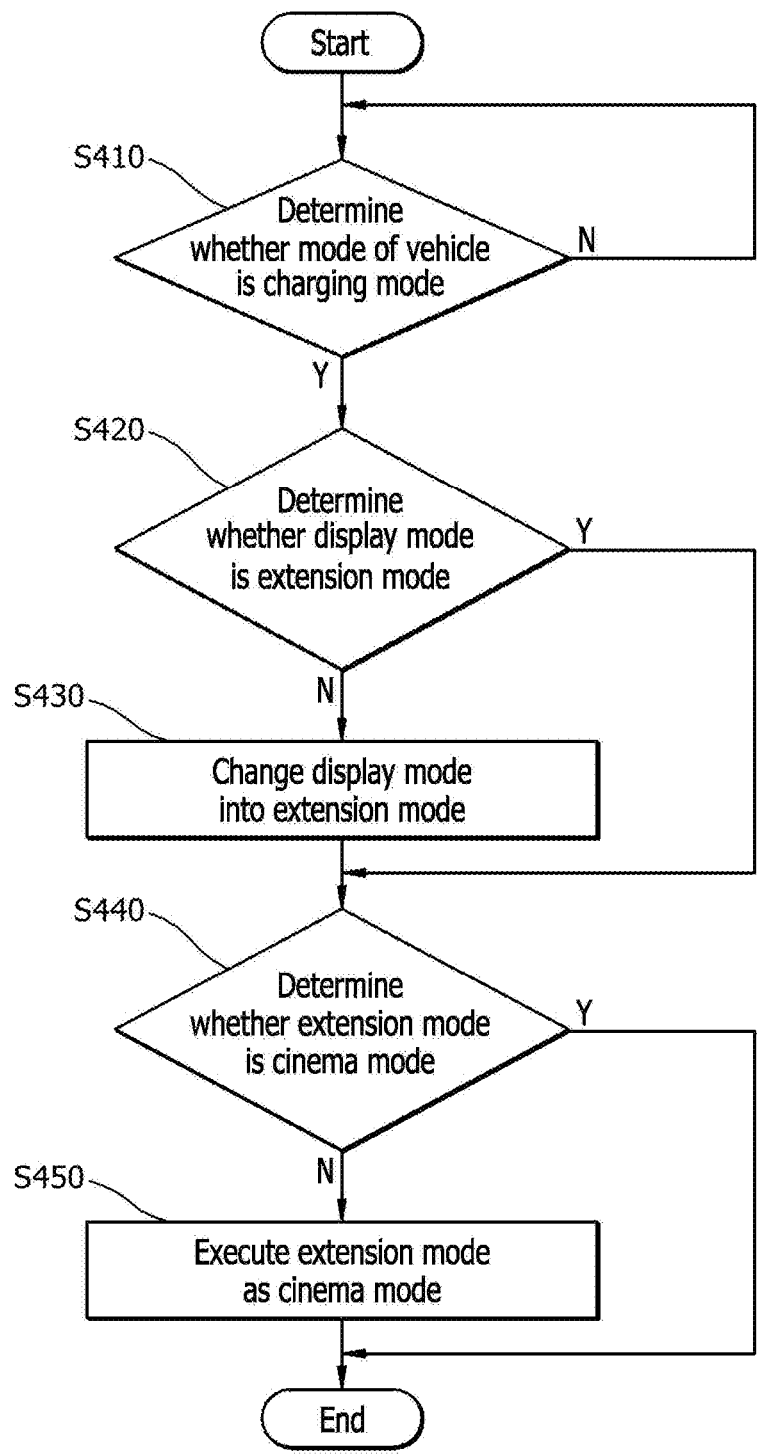
FIG. 28 is a diagram illustrating a control flow when a vehicle is in a charging mode in the display apparatus for a vehicle according to an embodiment of the present disclosure.
Figure 29:
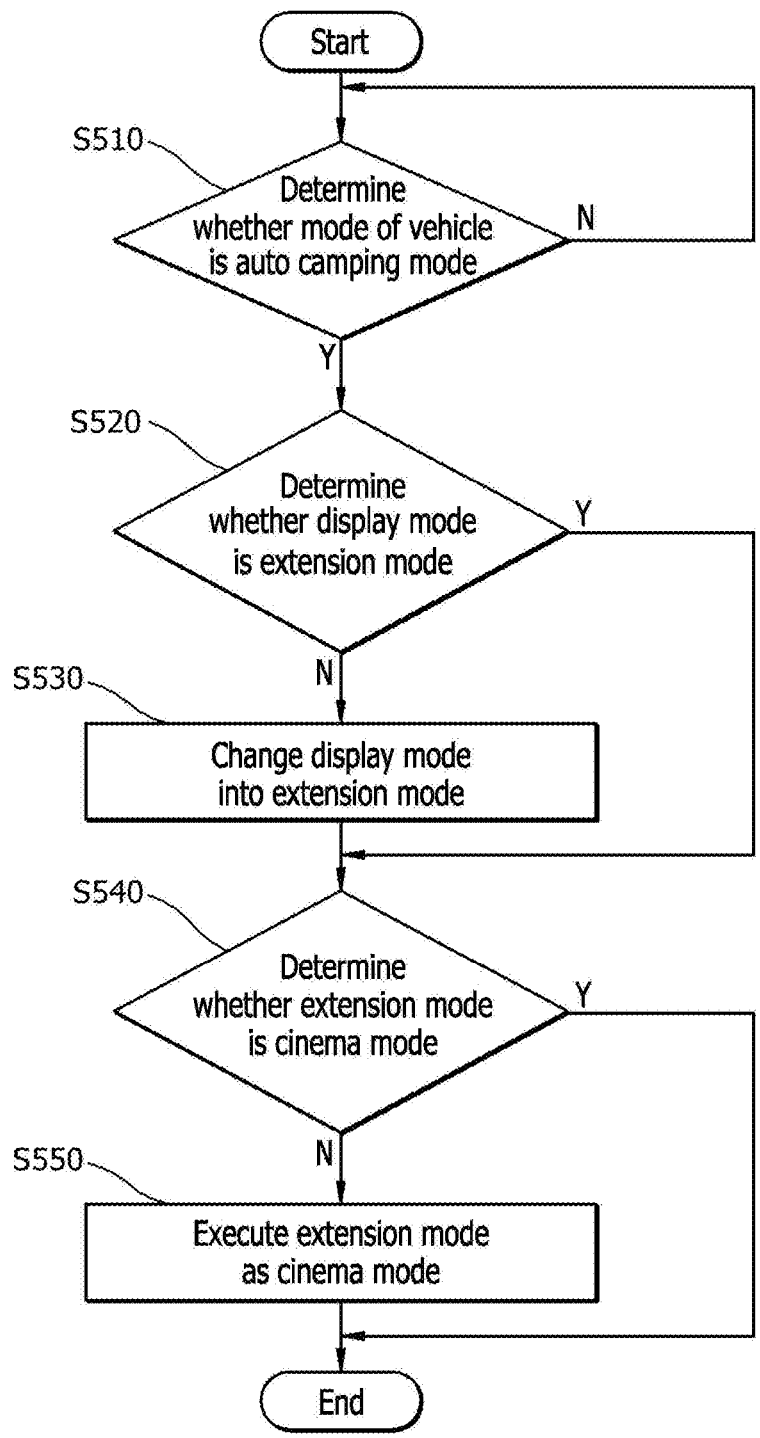
FIG. 29 is a diagram illustrating a control flow when a vehicle is in an auto camping mode in the display apparatus for a vehicle according to an embodiment of the present disclosure.

FIG. 24 is a diagram illustrating a control flow in the state in which the start-up of a vehicle has become on in the display apparatus for a vehicle according to an embodiment of the present disclosure. FIG. 25 is a diagram illustrating a control flow when a vehicle is in a night driving state in the display apparatus for a vehicle according to an embodiment of the present disclosure. FIG. 26 is a diagram illustrating a control flow when a vehicle is in a sports driving mode in the display apparatus for a vehicle according to an embodiment of the present disclosure. FIG. 27 is a diagram illustrating a control flow when a vehicle is in an autonomous driving mode in the display apparatus for a vehicle according to an embodiment of the present disclosure. FIG. 28 is a diagram illustrating a control flow when a vehicle is in a charging mode in the display apparatus for a vehicle according to an embodiment of the present disclosure. FIG. 29 is a diagram illustrating a control flow when a vehicle is in an auto camping mode in the display apparatus for a vehicle according to an embodiment of the present disclosure.

FIG. 24 is a diagram illustrating a control flow in the state in which the start-up of a vehicle has become on in the display apparatus for a vehicle according to an embodiment of the present disclosure.

Referring to FIG. 24, a method of controlling a display apparatus for a vehicle according to the present embodiment may include a step S10 of determining whether the start-up of a vehicle has become on, a step of activating the display unit 300 when it is determined that the start-up of the vehicle has become on, a step S20 of determining whether a display mode of the activated display unit 300 is the standard mode, and a step 30 of changing the display mode into the standard mode when it is determined that the display mode is not the standard mode.

The step S10 of determining whether the start-up of the vehicle has become on may be performed by receiving, by the control part 600, an operation signal of a start-up device (not illustrated) which is generated when a passenger starts the vehicle up. When the start-up device becomes on, the control part 600 determines that the start-up of the vehicle has become on, and activates the display unit 300 by making on the display unit 300.

When the display unit 300 is activated, the control part 600 determines whether a display mode of the display unit 300 is the standard mode (S20).

If the display mode is not the standard mode, the control part 600 operates the driving part 400 so that the display gear part 370 reaches the second point on the guide part 200. The control part 600 detects whether the display gear part 370 reaches the second point on the guide part 200 through the second sensor part 520. When it is confirmed that the display gear part 370 reaches the second point, the control part 600 stops the operation of the driving part 400. Accordingly, a change from the display mode of the display apparatus for a vehicle to the standard mode is completed (S30). When it is determined that the display mode is the standard mode, the control part 600 terminates control over the operation of the driving part 400 without a need to separately drive the driving part 400.

The time taken to change a mode of the display apparatus for a vehicle into another mode can be reduced because the mode is set as the standard mode that is the normal mode, among the plurality of display modes, when the passenger starts the vehicle up.

In the present embodiment, the step of determining whether the start-up of the vehicle has become on may be replaced with a case in which whether a mode of the vehicle is the autonomous driving mode is determined. That is, the method of controlling a display apparatus for a vehicle according to the present embodiment may be implemented by a step of determining whether a mode of the vehicle is the autonomous driving mode, a step of activating the display unit 300 when it is determined that the mode of the vehicle is the autonomous driving mode, a step of determining whether a display mode of the activated display unit 300 is the standard mode, and a step of changing the display mode into the standard mode when it is determined that the display mode is not the standard mode.

FIG. 25 is a diagram illustrating a control flow when a vehicle is in the night driving state in the display apparatus for a vehicle according to an embodiment of the present disclosure.

Referring to FIG. 25, a method of controlling a display apparatus for a vehicle according to the present embodiment may include a step S110 of determining whether the vehicle is in the night driving state, a step S120 of determining whether a display mode of the display unit 300 is the reduction mode when it is determined that the vehicle is in the night driving state, and a step S130 of changing the display mode into the reduction mode when it is determined that the display mode is not the reduction mode.

A vehicle includes an illumination sensor (not illustrated) for distinguishing between day and night based on the brightness of light. The step S110 of determining whether the vehicle is in the night driving state may be performed based on a day and night identification signal that is transmitted by the illumination sensor.

When it is determined that the vehicle is in the night driving state, the control part 600 determines whether a display mode of the display unit 300 is the reduction mode (S120). If the display unit 300 is in the state in which the display unit 300 has not been activated, that is, an OFF state, the control part 600 terminates control of an operation of the display unit 300.

When it is determined that the display mode is not the reduction mode, the control part 600 operates the driving part 400 so that the display gear part 370 reaches the first point on the guide part 200. The control part 600 detects whether the display gear part 370 reaches the first point on the guide part 200 through the first sensor part 510. When it is confirmed that the display gear part 370 has reached the first point, the control part 600 stops the operation of the driving part 400. Accordingly, a change from the display mode of the display apparatus for a vehicle to the reduction mode is completed (S130). When it is determined that the display mode is the reduction mode, the control part 600 terminates control over the operation of the driving part 400 without a need to separately drive the driving part 400.

In the method of controlling a display apparatus for a vehicle according to the present embodiment, a step of checking whether the passenger will accept a change into the reduction mode may be added between the step S120 of determining whether a display mode of the display unit 300 is the reduction mode and the step S130 of changing the display mode into the reduction mode when it is determined that the display mode is not the reduction mode. In this case, when the passenger accepts a change from the display mode into the reduction mode, the control part 600 changes the display mode into the reduction mode.

When the vehicle is in the night driving state or enters the night driving state, a display mode of the display apparatus for a vehicle is changed into the reduction mode that is the simple mode, among the plurality of display modes. Accordingly, a danger of accident which occurs in a passenger can be reduced because light that is emitted from the display unit 300 is minimized so that the passenger can concentrate on driving.

FIG. 26 is a diagram illustrating a control flow when a vehicle is in the sports driving mode in the display apparatus for a vehicle according to an embodiment of the present disclosure.

Referring to FIG. 26, the method of controlling a display apparatus for a vehicle according to the present embodiment may include a step S210 of determining whether a driving mode of the vehicle is the sports driving mode, a step S220 of determining whether a display mode of the display unit 300 is the reduction mode when it is determined that the driving mode of the vehicle is the sports driving mode, and a step S230 of changing the display mode into the reduction mode when it is determined that the display mode is not the reduction mode.

The step S210 of determining whether a driving mode of the vehicle is the sports driving mode may be performed by recognizing, by the control part 600, that a passenger selects the sports driving mode.

When detecting that the passenger selects the sports driving mode or the driving mode is changed into the sports driving mode, the control part 600 determines whether a display mode of the display unit 300 is the reduction mode (S220). If the display unit 300 is in the state in which the display unit 300 has not been activated, that is, an OFF state, the control part 600 terminates control of an operation of the display unit 300.

When it is determined that the display mode is not the reduction mode, the control part 600 operates the driving part 400 so that the display gear part 370 reaches the first point on the guide part 200. The control part 600 detects that the display gear part 370 reaches the first point on the guide part 200 through the first sensor part 510. When it is confirmed that the display gear part 370 has reached the first point, the control part 600 stops the operation of the driving part 400. Accordingly, a change from the display mode of the display apparatus for a vehicle to the reduction mode is completed (S230). When it is determined that the display mode is the reduction mode, the control part 600 terminates control over the operation of the driving part 400 without a need to separately drive the driving part 400.

In the method of controlling a display apparatus for a vehicle according to the present embodiment, a step of checking whether the passenger will accept a change into the reduction mode may be added between the step S220 of determining whether a display mode of the display unit 300 is the reduction mode and the step S230 of changing the display mode into the reduction mode when it is determined that the display mode is not the reduction mode. In this case, when the passenger accepts a change from the display mode to the reduction mode, the control part 600 changes the display mode into the reduction mode.

When a passenger drives a vehicle in the sports driving mode or a driving mode of the vehicle is changed into the sports driving mode, a display mode of the display apparatus for a vehicle is changed into the reduction mode that is the simple mode, among the plurality of display modes. Accordingly, light that is emitted from the display unit 300 is minimized so that the passenger can sufficiently secure a field of vision ahead of the vehicle.

FIG. 27 is a diagram illustrating a control flow when a vehicle is in the autonomous driving mode in the display apparatus for a vehicle according to an embodiment of the present disclosure.

Referring to FIG. 27, the method of controlling a display apparatus for a vehicle according to the present embodiment may include a step S310 of determining whether a driving mode of the vehicle is the autonomous driving mode, a step S320 of determining whether a display mode of the display unit 300 is the extension mode when it is determined that the driving mode of the vehicle is the autonomous driving mode, and a step S330 of changing the display mode into the extension mode when it is determined that the display mode is not the extension mode.

The step S310 of determining whether a driving mode of the vehicle is the autonomous driving mode may be performed by recognizing, by the control part 600, that a passenger selects the autonomous driving mode.

When recognizing that the passenger selects the autonomous driving mode, the control part 600 determines whether a display mode of the display unit 300 is the extension mode (S320). If the display unit 300 is in the state in which the display unit 300 has not been activated, that is, an OFF state, the control part 600 may activate the display unit 300 and then determine whether the display mode is the extension mode.

When it is determined that the display mode is not the extension mode, the control part 600 operates the driving part 400 so that the display gear part 370 reaches the third point on the guide part 200. The control part 600 detects whether the display gear part 370 reaches the third point on the guide part 200 through the third sensor part 530. When it is confirmed that the display gear part 370 reaches the third point, the control part 600 stops the operation of the driving part 400. Accordingly, a change from the display mode of the display apparatus for a vehicle to the extension mode is completed (S330). When it is determined that the display mode is the extension mode, the control part 600 terminates control over the operation of the driving part 400 without a need to separately drive the driving part 400.

In the method of controlling a display apparatus for a vehicle according to the present disclosure, a step of checking whether the passenger will accept a change into the extension mode may be added between the step S320 of determining whether a display mode of the display unit 300 is the extension mode and the step S330 of changing the display mode into the extension mode when it is determined that the display mode is not the extension mode. In this case, when the passenger accepts a change from the display mode into the extension mode, the control part 600 changes the display mode into the extension mode.

When a driving mode of the vehicle is changed from a common driving mode to the autonomous driving mode, the display apparatus for a vehicle may provide cluster information and infotainment content information to a passenger in detail through the display unit 300 by changing the common driving mode into the extension mode that is the full mode, among the plurality of display modes.

FIG. 28 is a diagram illustrating a control flow when a vehicle is in the charging mode in the display apparatus for a vehicle according to an embodiment of the present disclosure.

Referring to FIG. 28, the method of controlling a display apparatus for a vehicle according to the present embodiment may include a step S410 of determining whether a mode of the vehicle is the charging mode, a step S420 of determining whether a display mode of the display unit 300 is the extension mode when it is determined that the mode of the vehicle is the charging mode, and a step S430 of changing the display mode into the extension mode when it is determined that the display mode is not the extension mode.

The step S410 of determining whether a mode of the vehicle is the charging mode may be performed by detecting, by a charging sensor (not illustrated), that a charging cover is opened or a charger is connected to the vehicle.

When receiving an open signal or charger connection signal for the charging cover from the charging sensor, the control part 600 determines whether a display mode of the display unit 300 is the extension mode (S420). If the display unit 300 is in the state in which the display unit 300 has not been activated, that is, an OFF state, the control part 600 may activate the display unit 300 and then determine whether the display mode is the extension mode.

When it is determined that the display mode is not the extension mode, the control part 600 operates the driving part 400 so that the display gear part 370 reaches the third point on the guide part 200. The control part 600 detects that the display gear part 370 reaches the third point on the guide part 200 through the third sensor part 530. When it is confirmed that the display gear part 370 reaches the third point, the control part 600 stops the operation of the driving part 400. Accordingly, a change from the display mode of the display apparatus for a vehicle to the extension mode is completed (S430). When it is determined that the display mode is the extension mode, the control part 600 does not need to separately drive the driving part 400.

In the method of controlling a display apparatus for a vehicle according to the present embodiment, a step of checking whether a passenger will accept a change into the extension mode may be added between the step S420 of determining whether the display mode of the display unit 300 is the extension mode and the step S430 of changing the display mode into the extension mode when it is determined that the display mode is not the extension mode. In this case, when the passenger accepts a change from the display mode into the extension mode, the control part 600 changes the display mode into the extension mode.

The method of controlling a display apparatus for a vehicle according to the present embodiment may further include a step S440 of determining whether the extension mode is the cinema mode and a step S450 of executing the extension mode as the cinema mode when it is determined that the extension mode is not the cinema mode.

When a change from the display mode to the extension mode is completed, the control part 600 determines whether the extension mode is the cinema mode among several modes (S440). If the extension mode is not the cinema mode, the control part 600 executes the display mode as the cinema mode in the extension mode (S450).

When the cinema mode is executed, an image is output by the main infotainment display part 341. Accordingly, a passenger can watch various types of video including a movie and YouTube in a full screen form. If a passenger is in a situation in which the passenger does not need to drive for a long time, such as vehicle charging, as described above, control over the display apparatus for a vehicle may be performed for the relaxation of the passenger. When the cinema mode is executed, a location and angle of a seat may be adjusted in accordance with the cinema mode.

FIG. 29 is a diagram illustrating a control flow when a vehicle is in the auto camping mode in the display apparatus for a vehicle according to an embodiment of the present disclosure.

Referring to FIG. 29, the method of controlling a display apparatus for a vehicle according to the present embodiment may include a step S510 of determining whether a mode of the vehicle is the auto camping mode, a step S520 of determining whether a display mode of the display unit 300 is the extension mode when it is determined that the mode of the vehicle is the auto camping mode, and a step S530 of changing the display mode into the extension mode when it is determined that the display mode is not the extension mode.

The step S510 of determining whether a mode of the vehicle is the auto camping mode may be performed by recognizing, by the control part 600, that a passenger selects the auto camping mode.

When recognizing that the passenger selects the auto camping mode, the control part 600 determines whether a display mode of the display unit 300 is the extension mode (S520). If the display unit 300 is in the state in which the display unit 300 has not been activated, that is, an OFF state, the control part 600 may activate the display unit 300 and then determine whether the display mode is the extension mode.

When it is determined that the display mode is not the extension mode, the control part 600 operates the driving part 400 so that the display gear part 370 reaches the third point on the guide part 200. The control part 600 detects that the display gear part 370 reaches the third point on the guide part 200 through the third sensor part 530. When it is confirmed that the display gear part 370 reaches the third point, the control part 600 stops the operation of the driving part 400. Accordingly, a change from the display mode of the display apparatus for a vehicle to the extension mode is completed (S530). When it is determined that the display mode is the extension mode, the control part 600 does not need to separately drive the driving part 400.

In the method of controlling a display apparatus for a vehicle according to the present embodiment, a step of checking whether the passenger will accept a change into the extension mode may be added between the step S520 of determining whether a display mode of the display unit 300 is the extension mode and a step S530 of changing the display mode into the extension mode when it is determined that the display mode is not the extension mode. In this case, when the passenger accepts a change from the display mode into the extension mode, the control part 600 changes the display mode into the extension mode.

The method of controlling a display apparatus for a vehicle according to the present embodiment may further include a step S540 of determining whether the extension mode is the cinema mode and a step S550 of executing the extension mode as the cinema mode when it is determined that the extension mode is not the cinema mode.

When a change from the display mode to the extension mode is completed, the control part 600 determines whether the extension mode is the cinema mode among several modes (S540). When it is determined that the extension mode is not the cinema mode, the control part 600 executes the display mode as the cinema mode in the extension mode (S550).

When the cinema mode is executed, an image is output by the main infortainment display part 341. Accordingly, a passenger can watch various types of video including a movie and YouTube in a full screen form. If a passenger uses a vehicle as another type of means other than moving means as in a situation in which the passenger stays at the vehicle as described above, control over the display apparatus for a vehicle may be performed for the relaxation of the passenger.

According to the display apparatus for a vehicle according to an embodiment of the present disclosure, since the display unit 300 is moved in the cockpit part 100 in a swivel moving way, a space that is used to receive the display unit 300 within the cockpit part 100 can be reduced, and the utilization of an interior space of a vehicle can be improved.

Furthermore, according to an embodiment of the present disclosure, an increase in the size of the display unit 300 can be implemented while not increasing the thickness of the cockpit part 100 because a receiving space within the cockpit part 100 can be reduced.

Furthermore, according to an embodiment of the present disclosure, a phenomenon in which a screen is crushed or distorted can be reduced because a front surface from which various types of information or content are output in the plurality of display parts 310 is formed of a plane.

Furthermore, according to the present disclosure, driving convenience along with relaxation convenience can be improved because a specific mode, among a plurality of display modes, can be selected depending on a situation.

Furthermore, according to the present disclosure, driving convenience along with relaxation convenience can be improved and a danger of an accident can be reduced because a specific mode, among a plurality of display modes, can be selected depending on a situation.

Furthermore, according to the present disclosure, since the display unit can be manipulated in a contactless way, the occurrence of a health and hygiene problem, such as a virus infection attributable to direct contact with the display unit, can be reduced.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A display apparatus for a vehicle, comprising:
a cockpit part comprising an opening;
a guide part mounted within the cockpit part;
a display unit disposed within the cockpit part, moved along the guide part so that the display unit has a curved line-shaped moving path and configured to appear and disappear through the opening; and
a driving part configured to provide electric power to the display unit so that the display unit is moved on the guide part,
wherein:
the display unit is moved along the guide part so that the display unit comes from and goes to a plurality of points on the guide part,
a protruding height of the display unit that protrudes to an outside through the opening is different at each of the plurality of points,
the display unit comprises a plurality of display parts for outputting a screen, and
the display parts that neighbor each other are connected to form a set angle.

2. The display apparatus of claim 1, wherein the display unit further comprises:
a display bracket part configured to support the display parts; and
a display gear part rotatably mounted on the display bracket part and moved along the guide part while being rotated by the driving part.

3. The display apparatus of claim 2, wherein each of the plurality of display parts comprises:
a first display part formed to have a first upper and lower width and configured to protrude to the outside through the opening when the display gear part reaches a first point on the guide part;
a second display part connected to a bottom of the first display part, formed to have a second upper and lower width, and configured to protrude to the outside through the opening when the display gear part reaches a second point on the guide part; and
a third display part connected to a bottom of the second display part, formed to have a third upper and lower width, and configured to protrude to the outside through the opening when the display gear part reaches a third point on the guide part.

4. The display apparatus of claim 3, wherein the guide part comprises:
a guide body part mounted on the cockpit part and formed to have a curved surface toward a passenger seat; and
a guide gear part having a gear formed along the curved surface of the guide body part so that a path of the display gear part is formed and engaged with the display gear part.

5. The display apparatus of claim 4, further comprising:
a sensor part disposed in the guide body part in a plural number along the guide gear part and configured to detect a location of the display unit; and
a control part configured to control an operation of the driving part in response to a detection signal from the plurality of sensor parts.

6. The display apparatus of claim 5, wherein the control part is configured to:
enable the first display part to protrude to the outside through the opening, and the second display part and the third display part to be disposed within the cockpit part by driving and controlling the display gear part so that the display gear part reaches the first point on the guide part when receiving a reduction mode command,
enable the first display part and the second display part to protrude to the outside through the opening, and the third display part to be disposed within the cockpit part by driving and controlling the display gear part so that the display gear part reaches the second point on the guide part when receiving a standard mode command, and
enable the first display part and the second display part and the third display part to protrude to the outside through the opening by driving and controlling the display gear part so that the display gear part reaches the third point on the guide part when receiving an extension mode command.

7. A display apparatus for a vehicle, comprising:
a cockpit part comprising an opening;
a guide part mounted within the cockpit part;
a display unit disposed within the cockpit part, moved along the guide part so that the display unit has a curved line-shaped moving path and configured to appear and disappear through the opening;
a driving part configured to provide electric power to the display unit so that the display unit is moved on the guide part;
an air gesture detection part installed in the cockpit part and configured to detect a movement of a passenger; and
a control part configured to control an operation of the display unit in response to a gesture signal from the air gesture detection part,
wherein the air gesture detection part comprises:
an air sensor part configured to scan a movement of the passenger; and
an air gesture recognition part configured to recognize an air gesture corresponding to the movement of the passenger,
wherein the control part controls an operation of a display screen of the display unit in response to the air gesture recognized by the air gesture recognition part; and
wherein the air gesture detection part comprises:
a first air gesture detection part installed at a top of the cockpit part through which the display unit appears and disappears;
a second air gesture detection part installed on a front surface of the cockpit part so that the second air gesture detection part is closer to a passenger than the first air gesture detection part; and
a third air gesture detection part installed in a central partition part of the cockpit part.

8. The display apparatus of claim 7, wherein:
the display unit is moved along the guide part so that the display unit comes from and goes to a plurality of points on the guide part, and
a protruding height of the display unit that protrudes to an outside through the opening is different at each of the plurality of points.

9. The display apparatus of claim 8, wherein:
the display unit comprises a plurality of display parts for outputting a screen, and
the display parts that neighbor each other are connected to form a set angle.

10. The display apparatus of claim 9, wherein the plurality of display parts comprises:
a first display part formed to have a first upper and lower width and formed to have a plane as a front surface thereof;
a second display part connected to a bottom of the first display part, formed to have a second upper and lower width, and formed to have a plane as a front surface thereof; and
a third display part connected to a bottom of the second display part, formed to have a third upper and lower width, and formed to have a plane as a front surface thereof.

11. The display apparatus of claim 10, wherein the control part is configured to:
enable the first display part to protrude to the outside through the opening and the second display part and the third display part to be disposed within the cockpit part, when receiving a reduction mode command,
enable the first display part and the second display part to protrude to the outside through the opening and the third display part to be disposed within the cockpit part, when receiving a standard mode command, and
enable the first display part, the second display part, and the third display part to protrude to the outside through the opening, when receiving an extension mode command.

12. A method of controlling a display apparatus for a vehicle in which a protruding height of a display unit that protrudes to an outside through an opening of a cockpit part based on a plurality of display modes is adjusted in multiple stages, the method comprising:
determining whether a start-up of the vehicle has become on;
activating the display unit when it is determined that the start-up of the vehicle has become on;
determining whether a display mode of the activated display unit is a standard mode; and
changing the display mode into the standard mode when it is determined that the display mode is not the standard mode;
wherein the plurality of display modes comprises:
the standard mode;
a reduction mode in which a protruding height of the display unit is smaller than a protruding height of the display unit in the standard mode; and
an extension mode in which a protruding height of the display unit is greater than the protruding height of the display unit in the standard mode.

13. The method of claim 12, wherein the display unit comprises:
a first display part formed to have a first upper and lower width and configured to protrude to the outside through the opening in the reduction mode, the standard mode, and the extension mode;
a second display part connected to a bottom of the first display part, formed to have a second upper and lower width, and configured to protrude to the outside through the opening in the standard mode and the extension mode; and
a third display part connected to the bottom of the second display part, formed to have a third upper and lower width, and configured to protrude to the outside through the opening in the extension mode.

14. The method of claim 13, wherein:
a screen area that is formed by the first display part and the second display part that have protruded to the outside through the opening in the standard mode comprises a standard cluster display part and a standard infotainment display part,
the standard cluster display part is disposed on one side of the screen area and configured to display at least any one of a driving environment, navigation information, and a speedometer in a graphic form, and
the standard infotainment display part is disposed on other side of the screen area and configured to display infotainment content in a graphic form.

* * * * *